United States Patent
Vandewalle et al.

(10) Patent No.: US 10,368,046 B2
(45) Date of Patent: Jul. 30, 2019

(54) METHOD AND APPARATUS FOR GENERATING A THREE DIMENSIONAL IMAGE

(71) Applicant: KONINKLIJKE PHILIPS N.V., Eindhoven (NL)

(72) Inventors: Patrick Luc Els Vandewalle, Eindhoven (NL); Bart Kroon, Eindhoven (NL); Christiaan Varekamp, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 186 days.

(21) Appl. No.: 15/315,514

(22) PCT Filed: Jun. 12, 2015

(86) PCT No.: PCT/EP2015/063211
§ 371 (c)(1),
(2) Date: Dec. 1, 2016

(87) PCT Pub. No.: WO2015/193198
PCT Pub. Date: Dec. 23, 2015

(65) Prior Publication Data
US 2017/0150115 A1    May 25, 2017

(30) Foreign Application Priority Data
Jun. 19, 2014   (EP) .................... 14173093

(51) Int. Cl.
*H04N 13/111*   (2018.01)
*H04N 13/305*   (2018.01)
(Continued)

(52) U.S. Cl.
CPC ......... *H04N 13/111* (2018.05); *H04N 13/128* (2018.05); *H04N 13/275* (2018.05);
(Continued)

(58) Field of Classification Search
None
See application file for complete search history.

(56) References Cited

U.S. PATENT DOCUMENTS 6,496,598 B1 * 12/2002 Harman ............... H04N 13/261
382/154
8,259,130 B2   9/2012 Brown et al.
(Continued)

OTHER PUBLICATIONS

Lee, "Nongeometric Distortion Smoothing Approach for Depth Map Processing" IEEE. Transactions on Multimedia, vol. 13, No. 2, Apr. 2011 p. 246-254.
(Continued)

*Primary Examiner* — Christopher Braniff

(57) ABSTRACT

An autostereoscopic 3D display comprises a first unit (503) for generating an intermediate 3D image. The intermediate 3D image comprises a plurality of regions and the first unit (503) is arranged to generate a first number of image blocks of pixel values corresponding to different view directions for the region regions. The number of image blocks is different for some regions of the plurality of regions. A second unit (505) generates an output 3D image comprising a number of view images from the intermediate 3D image, where each of the view images correspond to a view direction. The display further comprises a display arrangement (301) and a driver (507) for driving the display arrangement (301) to display the output 3D image. An adaptor (509) is arranged to adapt the number of image blocks for a first region in response to a property of the intermediate 3D image or a representation of a three dimensional scene from which the first image generating unit (503) is arranged to generate the intermediate image.

20 Claims, 11 Drawing Sheets

(51) Int. Cl.
    *H04N 13/275*     (2018.01)
    *H04N 13/398*     (2018.01)
    *H04N 13/324*     (2018.01)
    *H04N 13/351*     (2018.01)
    *H04N 13/302*     (2018.01)
    *H04N 13/128*     (2018.01)
    *H04N 13/282*     (2018.01)

(52) U.S. Cl.
    CPC ......... *H04N 13/302* (2018.05); *H04N 13/305* (2018.05); *H04N 13/324* (2018.05); *H04N 13/351* (2018.05); *H04N 13/398* (2018.05); *H04N 13/282* (2018.05); *H04N 2213/001* (2013.01); *H04N 2213/003* (2013.01)

(56) References Cited

U.S. PATENT DOCUMENTS

| | | |
|---|---|---|
| 2006/0139361 A1 | 6/2006 | Busch et al. |
| 2012/0148173 A1* | 6/2012 | Shin .................... H04N 13/194 |
| | | 382/300 |
| 2012/0169722 A1 | 7/2012 | Hwang et al. |
| 2012/0194905 A1 | 8/2012 | Ushio et al. |
| 2013/0009943 A1 | 1/2013 | Li et al. |
| 2013/0038606 A1 | 2/2013 | Ushiki et al. |
| 2014/0085433 A1 | 3/2014 | Han et al. |

OTHER PUBLICATIONS

Oh et al Depth Reconstruction Filter and Down/Up Sampling for Depth Coding in 3-D Video IEEE Signal Processing Letters, vol. 16, No. 9, Sep. 2009 , p. 747-750.

* cited by examiner

METHOD AND APPARATUS FOR GENERATING A THREE DIMENSIONAL IMAGE

CROSS-REFERENCE TO PRIOR APPLICATIONS

This application is the U.S. National Phase application under 35 U.S.C. § 371 of International Application No. PCT/EP2015/063211, filed on Jun. 12, 2015, which claims the benefit of EP Patent Application No. EP 14173093.7, filed on Jun. 19, 2014. These applications are hereby incorporated by reference herein.

FIELD OF THE INVENTION

The invention relates to processing of a three dimensional image, and in particular, but not exclusively, to generation of a three dimensional image for presentation on an autostereoscopic display.

BACKGROUND OF THE INVENTION

Three dimensional (3D) displays are receiving increasing interest, and significant research in how to provide three dimensional perception to a viewer is being undertaken. 3D displays add a third dimension to the viewing experience by providing a viewer's two eyes with different views of the scene being watched. This can be achieved by having the user wear glasses to separate two views that are displayed. However, as this is relatively inconvenient to the user, it is in many scenarios desirable to use autostereoscopic displays that directly generate different views and projects them to the eyes of the user. Indeed, for some time, various companies have actively been developing autostereoscopic displays suitable for rendering three-dimensional imagery. Autostereoscopic devices can present viewers with a 3D impression without the need for special headgear and/or glasses.

Autostereoscopic displays generally provide different views for different viewing angles. In this manner, a first image can be generated for the left eye and a second image for the right eye of a viewer. By displaying appropriate images, i.e. appropriate from the viewpoint of the left and right eye respectively, it is possible to convey a 3D impression to the viewer.

Autostereoscopic displays tend to use means, such as lenticular lenses or parallax barriers/barrier masks, to separate views and to send them in different directions such that they individually reach the user's eyes. For stereo displays, two views are required but most autostereoscopic displays typically utilize more views (such as e.g. nine views).

In order to fulfill the desire for 3D image effects, content is created to include data that describes 3D aspects of the captured scene. For example, for computer generated graphics, a three dimensional model can be developed and used to calculate the image from a given viewing position. Such an approach is for example frequently used for computer games that provide a 3D effect.

As another example, video content, such as films or television programs, are increasingly generated to include some 3D information. Such information can be captured using dedicated 3D cameras that capture two simultaneous images from slightly offset camera positions thereby directly generating stereo images, or may e.g. be captured by cameras that are also capable of capturing depth.

Typically, autostereoscopic displays produce "cones" of views where each cone contains multiple views that correspond to different viewing angles of a scene. The viewing angle difference between adjacent (or in some cases further displaced) views are generated to correspond to the viewing angle difference between a user's right and left eye. Accordingly, a viewer whose left and right eye see two appropriate views will perceive a 3D effect. An example of such a system wherein nine different views are generated in a viewing cone is illustrated in FIG. 1.

Many autostereoscopic displays are capable of producing a large number of views. For example, autostereoscopic displays which produce nine views are not uncommon. Such displays are e.g. suitable for multi-viewer scenarios where several viewers can watch the display at the same time and all experience the 3D effect. Displays with even higher number of views have also been developed, including for example displays that can provide e.g. 28 different views. Such displays may often use relatively narrow view cones resulting in the viewer's eyes receiving light from a plurality of views simultaneously. Also, the left and right eyes will typically be positioned in views that are not adjacent (as in the example of FIG. 1).

FIG. 2 illustrates an example of the formation of a 3D pixel (with three color channels) from multiple sub-pixels. In the example, w is the horizontal sub-pixel pitch, h is the vertical sub-pixel pitch, N is the average number of sub-pixels per single-colored patch. The lenticular lens is slanted by s=tan θ, and the pitch measured in horizontal direction is p in units of sub-pixel pitch. Within the 3D pixel, thick lines indicate separation between patches of different colors and thin lines indicate separation between sub-pixels. Another useful quantity is the sub-pixel aspect ratio: a=w/h. Then N=a/s. For the common slant ⅙ lens on RGB-striped pattern, a=⅓ and s=⅙, so N=2.

As for conventional 2D displays, image quality is of the utmost importance for a 3D display in most applications, and especially is very important for the consumer market, such as e.g. for 3D televisions or monitors. However, the representation of different views provides additional complications and potential image degradations.

Specifically, in order to keep the amount of data to distribute and process to a manageable amount, 3D content is typically provided in a format based on a very low number of 2D images. For example, 3D image data may be provided by a single 2D image corresponding to one viewing angle supported by a depth map indicating a depth for each pixel. Another common representation provides two 2D images, with one being intended for the viewer's left eye and the other for the viewer's right eye.

Thus, the three dimensional image information is typically provided in a compressed format, and typically is represented by a relatively low number of different view point images. In order to provide view images for each individual view direction of the autostereoscopic display, it is accordingly necessary to apply substantial processing to the received data. Specifically, in order to generate the view images for the autostereoscopic display, it is typically necessary to perform rendering and also (3D) image processing. For example, view point shifting based on depth information is often necessary to generate additional views.

As another example, in some applications, 3D image data is generated directly by evaluating a 3D model, such as for example by generating the image data based on a 3D model. The model may for example conform to the OpenGL graphics standard and may contain triangles and/or meshes in combination with textures. Thus, in some applications, an image for a specific viewing angle may be generated by evaluating a 3D graphical model of a three-dimensional scene.

When using an autostereoscopic display for 3D presentation, a relatively large number of individual views corresponding to different viewing angles are projected, such as typically 9, 15 or 29 views. Accordingly, a large number of images corresponding to different viewing angles must be generated. This can be achieved by performing a 3D processing of the input 3D image data for each view. E.g., for each view, an input image corresponding to a default viewing angle is processed to generate the corresponding view for the desired viewing angle. This 3D processing in particular includes disparity shifting of pixels depending on their depth, filling in de-occluded areas etc.

Similarly, in some system based on evaluating a 3D model, the model may be evaluated for each view to generate the image corresponding to that viewing angle.

Thus, in some systems, 3D processing is performed to generate an image for each view of the autostereoscopic display. However, a disadvantage of such an approach is that it is very computationally demanding and requires a high computational resource. This may be particularly critical for 3D images that are part of e.g. a video sequence or game requiring real time processing.

In order to reduce the computational complexity, it has been proposed to only render a subset of the images that are required for the autostereoscopic display. For example, the 3D processing may generate only 8 images for a 15 view image. In such systems, the image for each view may be generated by selecting the generated image that corresponds to the closest viewing angle to that of the view. In some systems, a given view image may be generated by a simple linear interpolation between e.g. the two rendered images surrounding the current view image (i.e. corresponding to the images having the closest viewing angle in each direction).

Indeed, currently, when content is rendered for an autostereoscopic 3D display, the typical approach is to render a fixed number of images corresponding to fixed viewing angles. Subsequently, for each pixel of the autostereoscopic display the required output viewing angle is determined, and the pixel is then generated by selecting the corresponding pixel in the rendered image for the nearest viewing angle, or by a weighted summation of the pixels of the images with the nearest viewing angles.

However, although such an approach may reduce the overall computational resource usage, it also tends to introduce a number of disadvantages. In particular, the approach tends to reduce the perceived image quality and introduces a number of artefacts.

For example, if a relatively low number of images are rendered by the 3D processing, edges in the perceived 3D image will tend to exhibit a ghosting effect (e.g. multiple slightly displaced copies of the edge of an object will often be experienced). Also, if a user moves relative to the display such that the eyes of the viewer move through multiple views of the view cone, a relatively uneven experience will result where image objects may appear to jump or jitter in position as the viewer's eyes move between the views.

Therefore, in order to produce a high image quality, it is desirable that a large number of images are rendered. However, this increases complexity and resource use, and thus there is an inherent trade-off between quality and complexity which tends to be suboptimal in prior art systems.

Hence, an improved approach for generating view images would be advantageous, and, in particular, an approach allowing increased flexibility, improved image quality, reduced complexity, reduced resource demand, an improved trade-off between complexity and perceived image quality, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for generating an output three dimensional image, the apparatus comprising: a first image generating unit for generating an intermediate three dimensional image, the intermediate three dimensional image comprising a plurality of regions being spatial subdivisions of the intermediate three dimensional image and the first image generating unit being arranged to generate a number of image blocks of pixel values for the plurality of regions, the number of image blocks being different for at least two regions of the plurality of regions and each image block comprising pixel values for a group of pixels corresponding to a view direction; a second image generating unit for generating the output three dimensional image comprising a number of view images from the intermediate three dimensional image, each of the number of view images corresponding to a view direction; an adaptor for adapting a number of image blocks with different viewing directions for at least a first region of the plurality of regions in response to a property of at least one of the intermediate three dimensional image and a representation of a three dimensional scene from which the first image generating unit is arranged to generate the intermediate three dimensional image.

The invention may in many embodiments provide an improved three dimensional image which when displayed on a three dimensional display, such as an autostereoscopic display, may provide improved perceived image quality. In many embodiments, the approach may result in e.g. perceived reduced cross-talk effects, e.g. when the second three dimensional image is presented on an autostereoscopic display. The approach may in many embodiments generate a three dimensional image in which the perceptual impact of image degradations and artifacts is reduced. When displayed, a viewer may perceive a more natural looking three dimensional scene. The approach may in particular in many embodiments provide a smoother experience when a user moves through the view cones of an autostereoscopic display.

The invention may in many embodiments reduce complexity. The approach may in many scenarios substantially reduce the required amount of three dimensional processing of image data. The approach may in many embodiments provide a more efficient use of available computational resource, or may e.g. reduce the required computational resource. Reduced complexity processing can be achieved for large areas of the output three dimensional image. The computational resource usage may be reduced substantially. The approach may for example enable generation of a relatively high number of view images even in devices with relatively low computational capability.

The invention may in many embodiments and scenarios provide an improved computational resource versus image quality trade-off. In particular, the approach may allow the available computational resource to be targeted at the most critical parts of the three dimensional image. Thus, the adaptation of the number of views represented by image blocks generated by the first image generating unit based on a property of the three dimensional image may adapt the available processing power to improve image quality where it is most likely to be noticeable by a user. Specifically, it may allow artefact reduction and mitigation to be focused on areas where such artefacts are most likely to occur or to be most noticeable.

In particular, the adapter may perform a local adaptation of the number of views rendered by the first image generating unit, and this adaptation may be based on the local image characteristics. Thus, in the system, different regions of the intermediate image may be represented by a different number of image blocks, each image block corresponding to a different viewing angle. The number of image blocks/viewing angles in each region is thus dependent on a local image property.

A three dimensional image may be any representation of a three dimensional scene and specifically may be any data providing visual information and (associated) depth information. A three dimensional image may e.g. be two or more (potentially partial) images corresponding to different viewpoints of a scene. A three dimensional image may e.g. be two 2D images corresponding to a left eye view and a right eye view. In some scenarios, a three dimensional image may be represented by more than two views, such as e.g. by 2D images for 9 or 28 views of an autostereoscopic display. In some scenarios, depth information (e.g. provided as disparity or displacement data) may be provided as part of the three dimensional image. In some embodiments, a three dimensional image may for example be provided as a single image together with associated depth information. In some scenarios, a three dimensional image may be provided as a 2D image from a given view direction together with occlusion data and depth data. For example, a three dimensional image may be provided as a Z-stack representation and possibly an associated depth map. For example, a Z-stack may comprise a top layer corresponding to the full image for a given view point. Thus, a two dimensional display could directly render this image. As the image comprises pixels at different depths (e.g. some are background pixels and other pixels correspond to different foreground objects at different depths), the top layer image may have an associated depth map. The second layer of the Z-stack may then comprise occlusion information for the top layer. Specifically, for each pixel of the top layer, the second layer may comprise a pixel representing what would be seen if the image object represented by the corresponding pixel in the top layer were not present. In case, the corresponding pixel is already a background pixel (and thus there is no occlusion), the second layer may not comprise any pixel value for this pixel. The approach may be repeated for any additional layers of the Z-stack. In some embodiments, a depth map may be provided for each layer of the Z-stack.

The first image generating unit may in some embodiments generate the intermediate three dimensional image by processing an input three dimensional image. In such embodiments, the first image generating unit may generate the intermediate three dimensional image to include image data for more views than the input image for at least some regions. In some embodiments, the first image generating unit may generate image data for the intermediate three dimensional image by evaluating a three dimensional graphical model of a scene for a particular viewing direction.

The first image generating unit may in some embodiments generate the intermediate three dimensional image by evaluating a three dimensional model.

The first image generating unit may be arranged to generate the intermediate three dimensional image using three dimensional image processing, the three dimensional image processing comprising a process being dependent on a depth of at least one image pixel being processed. The first image generating unit may be arranged to generate the intermediate three dimensional image using a process depth based/dependent image processing. The second image generating unit may be arranged to generate the output three dimensional image using a process not being dependent on a depth of any image pixel being processed. The second image generating unit may be arranged to generate the output three dimensional image from the intermediate three dimensional image using a non-depth based/dependent image processing. Thus, the first image generating unit may consider depth/disparity information when generating the intermediate three dimensional image whereas the second image generating unit does not consider depth/disparity information when generating the output three dimensional image.

Specifically, the second image generating unit may be arranged to generate the output three dimensional image in response to weighted linear combinations of image blocks of the intermediate three dimensional image. For example, for each pixel of each view image of the output three dimensional image, the pixel value(s) may be determined as a weighted linear combination of the corresponding pixel in the image blocks of the intermediate three dimensional image, the weights being dependent on the viewing angle of the view relative to the viewing angles of the image blocks.

The first image generating unit may generate the intermediate three dimensional image by depth based processing of an input three dimensional image. Such processing may for at least some regions include generating image blocks corresponding to viewing angles for which no image data is provided in the input three dimensional image. The processing of the input three dimensional image may accordingly include image viewing angle shifting. This may include pixel displacement, filling in de-occluded areas etc.

A region may correspond to any spatial subdivision of the intermediate three dimensional image.

The intermediate three dimensional image may be formed by a set of image blocks for each region of the intermediate three dimensional image with each set of image blocks comprising one or more image blocks, each image block of one set of image blocks corresponding to a different viewing angle. In many embodiments, each set of image blocks comprises a minimum of e.g. 2, 3 or 5 image blocks for different viewing angles. In many embodiments, image blocks for one or more viewing directions are comprised in all sets of image blocks. Thus, the intermediate three dimensional image may include a number of complete images (each associated with a viewing angle). For example, the intermediate three dimensional image may be represented by N complete view images, each corresponding to a different viewing angle, and in addition a subset of the sets of image blocks may comprise one or more image blocks for additional viewing angles. The number of additional image blocks/additional view angles for a given set/region is determined by the adaptor based on the image property in a neighborhood of the region of the set. The number of additional image blocks/additional view angles may vary between different regions.

The output three dimensional image may comprise a predetermined number of view images. Each view image may be a complete image, and thus may contain image data for all regions of the image. The output three dimensional image may be generated as a set of M images where each of the M images is directly generated as an image for one view of an autostereoscopic display. The output three dimensional image may be represented only by the M view images, and e.g. may not include any depth or disparity maps. The output three dimensional image may be represented as a set of separate view images, or may e.g. be represented by a weaved image comprising interleaved view images. In some embodiments or scenarios, one or more of the view images may be a partial image.

An image block may correspond to an image area or group of pixels for which visual pixel values are provided. Thus, an image block may be formed by pixel values for a group of pixels. The pixel values may be visual pixel values, such as e.g. luminance, chroma and/or chrominance values. The first image generating unit may generate an image block by generating pixel values for a group of pixels. For a given viewing direction, the intermediate three dimensional image may comprise areas for which no pixel values have been determined (empty areas or holes in the image) and image blocks for which pixel values have been generated by the first image generating unit. An image block may be a set of pixel values for a group of pixels.

A view image may be an image for a given viewing direction. It may be a complete image with no empty areas.

The property may be an image property for/in a neighborhood of the first region. The neighborhood may be a neighborhood in the intermediate three dimensional image or in the input three dimensional image.

In some embodiments, the number of image blocks for the first region of the plurality of regions may be adapted in response to a property of the intermediate three dimensional image, such as for example a depth and/or contrast for the first region in the intermediate three dimensional image.

In some embodiments, the intermediate three dimensional signal is generated from a representation of a three dimensional scene.

The three dimensional scene may for example in some embodiments be represented by an input three dimensional image and the intermediate three dimensional image may be generated from the input three dimensional image. In some embodiments, the number of image blocks for the first region of the plurality of regions may be adapted in response to a property of the input three dimensional image, such as for example a depth and/or contrast for the first region in the input three dimensional image.

The three dimensional scene may for example in some embodiments be represented by a three dimensional model (including e.g. modelling of textures and light sources). The intermediate three dimensional image may in such embodiments be generated from the three dimensional model. In some embodiments, the number of image blocks for the first region of the plurality of regions may be adapted in response to a property of a three dimensional model, such as for example a depth and/or contrast measure for model objects corresponding to the first region in the input/intermediate three dimensional image.

Thus, in many embodiments, the adaptor may be arranged to adapt a number of image blocks with different viewing directions for at least a first region of the plurality of regions in response to a property of at least one of the intermediate three dimensional image, a property of an input three dimensional image in response to which the first image generating unit is arranged to generate the intermediate image, and a three dimensional model in response to which the first image generating unit is arranged to generate the intermediate image.

In accordance with an optional feature of the invention, the property is a depth measure.

The property may specifically be a neighborhood depth measure. The adapter may be arranged to determine the number of image blocks for a first region in response to a depth measure for a neighborhood of the first region. A neighborhood may be an area comprising at least one pixel belonging to the first region. The adapter may be arranged to determine the number of image blocks for a first region in response to a depth measure for an area comprising at least one pixel of the first region.

The adapter may be arranged to perform this operation for all regions of the plurality of regions. The determination of the number of image blocks may be performed independently for each region.

The approach may provide an improved image quality versus computational resource usage in many embodiments and scenarios. The computational resource of an image generating apparatus may specifically be distributed unevenly across an image depending on the depth measure, and specifically rendering resource may be focused on regions having substantial depth deviations from a reference plane.

The depth measure may be indicative of a depth level, such as e.g. an average or weighted depth value reflecting depth values for pixels in a neighborhood of the region. In some embodiments, the depth measure may be indicative of a deviation of depth in the region from a reference depth, which specifically may be the screen level depth (corresponding to zero disparity between images of different views).

In accordance with an optional feature of the invention, the image property is a neighborhood contrast measure.

The property may specifically be a neighborhood contrast measure. The adapter may be arranged to determine the number of image blocks for a first region in response to a contrast measure for a neighborhood of the first region. A neighborhood may be an area comprising at least one pixel belonging to the first region. The adapter may be arranged to determine the number of image blocks for a first region in response to a contrast measure for an area comprising at least one pixel of the first region.

The adapter may be arranged to perform this operation for all regions of the plurality of regions. The determination of the number of image blocks may be performed independently for each region.

The approach may provide an improved image quality versus computational resource usage in many embodiments and scenarios. The computational resource of an image generating apparatus may specifically be distributed unevenly across an image depending on the contrast measure, and specifically rendering resource may be focused on regions exhibiting substantial local contrast.

The contrast measure may be indicative of a degree of contrast in a neighborhood of the region, and may e.g. be indicative of a degree of luminance/brightness/intensity variation in the neighborhood. In some embodiments, the contrast measure may be indicative of image object edge transitions in the neighborhood.

In some embodiments, the contrast measure is a horizontal contrast measure.

In many embodiments, the image property is at least one of a (neighborhood) depth measure and a (neighborhood)

contrast measure. The adapter may be arranged to determine the number of image blocks for a first region in response to at least one of a contrast measure and a depth measure for a neighborhood of the first region. The adapter may be arranged to perform this operation for all regions of the plurality of regions. The determination of the number of image blocks may be performed independently for each region.

In accordance with an optional feature of the invention, the adapter is further arranged to determine the number of image blocks for the first region in response to a computational resource availability for the first image generating unit.

The invention may e.g. provide an improved adaptation and often optimization of image quality for the available computational resource. Specifically, the approach may allow an adaptation of the image rendering such that limited available resource may e.g. be directed to areas wherein the impact on the resulting image quality is optimized.

In accordance with an optional feature of the invention, the plurality of regions comprises regions formed by at least one pixel row.

This may provide reduced complexity and simplified operation in many embodiments while still allowing a highly flexible targeting at resource. Furthermore, the approach may in many scenarios reduce computational resource for dividing the image into regions without this resulting in unacceptable increase in image degradation and/or processing required for processing each region.

In many scenarios, all regions of the plurality of regions are formed by one or more pixel rows.

In accordance with an optional feature of the invention, at least one region of the plurality of regions comprises only a subset of pixels of a pixel row.

This may provide improved targeting of resource in many embodiments, and may in particular provide a more accurate allocation of computational resource of the first image generating unit.

In accordance with an optional feature of the invention, the first image generation unit is arranged to generate image blocks for all regions of the plurality of regions for a first number of viewing directions, and the adapter is arranged to subsequently select a subset of regions of the plurality of regions for which to generate image blocks for at least one additional view direction in response to disparities between the image blocks of each region for the first number of viewing angles.

The invention may in many embodiments and scenarios provide an improved computational resource versus image quality trade-off. The approach may provide an efficient operation allowing accurate allocation of resource while allowing a low complexity and low resource demanding control and allocation approach to be used. The approach may provide facilitated and/or reduced implementation and/or operation.

In accordance with an optional feature of the invention, the adapter is arranged to select a region for which to generate an image block for at least one additional viewing angle in response to a disparity measure exceeding a threshold, the disparity measure being a measure of disparity for two image blocks for two viewing angles being adjacent to the additional viewing angle.

The invention may in many embodiments and scenarios provide an improved computational resource versus image quality trade-off. The approach may provide an efficient operation allowing accurate allocation of resource while allowing a low complexity and low resource demanding control and allocation approach to be used. The approach may provide a facilitated and/or reduced implementation and/or operation.

In accordance with an optional feature of the invention, the adapter is arranged to determine a subset of regions for which a depth measure is below a threshold, and to set the number of image blocks in each region of the subset to one.

For each region in the subset of regions, the first image generating unit may generate only 2D image information.

This may reduce computational resource for the subset of regions thereby freeing up resource allocation for other regions. In some embodiments, it may result in improved image quality.

In some embodiments, the first image generating unit is arranged to generate the intermediate three dimensional image from an input three dimensional image, the input three dimensional image being represented by at least one of a set of a plurality of two dimensional images corresponding to different viewing angles, and a two dimensional image with an associated depth map.

In some embodiments, the first image generating unit is arranged to generate the intermediate three dimensional image by evaluating a graphical three dimensional model.

In some embodiments, the property may be a non-spatial property, and specifically may be a non-depth property.

In accordance with an optional feature of the invention, the property is a visual property.

This may provide improved performance in many embodiments. The property may specifically be a visual property for a neighborhood of at least one pixel of the first region. The adapter may be arranged to determine the number of image blocks for the first region in response to a visual property for a neighborhood of the first region. A neighborhood (of the first region) may be an area comprising at least one pixel belonging to the first region. The adapter may be arranged to determine the number of image blocks for a first region in response to a visual property for an area comprising at least one pixel of the first region.

The adapter may be arranged to perform this operation for all regions of the plurality of regions. The determination of the number of image blocks may be performed independently for each region.

The visual property may be indicative of a visual property in a neighborhood of the region, and may e.g. be indicative of a degree of luminance/brightness/intensity variation in the neighborhood.

In accordance with an optional feature of the invention, the property is indicative of at least one of a brightness property and a color property.

This may provide improved performance in many embodiments. The property may specifically be indicative of at least one of a brightness property and a color property for a neighborhood of at least one pixel of the first region. The adapter may be arranged to determine the number of image blocks for the first region in response to at least one of a brightness property and a color property of a neighborhood of the first region. A neighborhood (of the first region) may be an area comprising at least one pixel belonging to the first region. The adapter may be arranged to determine the number of image blocks for a first region in response to a visual property for an area comprising at least one pixel of the first region.

The adapter may be arranged to perform this operation for all regions of the plurality of regions. The determination of the number of image blocks may be performed independently for each region.

The property may be indicative of at least one of a brightness property and a color property by having a value dependent on or at least partially derivable from at least one of a brightness value and a color value, including for example being dependent on brightness and/or color variations.

In accordance with an optional feature of the invention, the first image generation unit is arranged to generate the intermediate three dimensional image based on a three dimensional model of a three dimensional scene; and the adaptor is arranged to adapt the number of image blocks in response to a property of the three dimensional model In accordance with an aspect of the invention, there is provided autostereoscopic three dimensional display comprising: a first image generating unit for generating an intermediate three dimensional image, the intermediate three dimensional image comprising a plurality of regions and the first image generating unit being arranged to generate a number of image blocks of pixel values corresponding to view directions for the plurality of regions, the number of image blocks being different for at least two regions of the plurality of regions; a second image generating unit for generating the output three dimensional image comprising a second number of view images from the intermediate three dimensional image, each of the number of view images corresponding to a view direction; a display arrangement for displaying three dimensional images; a display driver for driving the display arrangement to display the output three dimensional image; and an adaptor for adapting a number of image blocks with different viewing directions for at least a first region of the plurality of regions in response to a property of at least one of the intermediate three dimensional image and a three dimensional input image to the first image generating unit.

In accordance with an aspect of the invention, there is provided a method of generating an output three dimensional image, the method comprising: generating an intermediate three dimensional image comprising a plurality of regions by generating a number of image blocks of pixel values corresponding to view directions for the plurality of regions, the number of image blocks being different for at least two regions of the plurality of regions; generating the output three dimensional image comprising a second number of view images from the intermediate three dimensional image, each of the number of view images corresponding to a view direction; adapting a number of image blocks with different viewing directions for at least a first region of the plurality of regions in response to a property of at least one of the intermediate three dimensional image and a three dimensional input image used to generate the intermediate three dimensional image.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
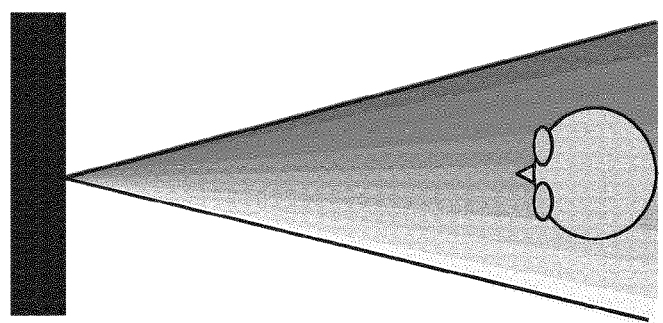
FIG. 1 illustrates an example of views generated from an autostereoscopic display.
Figure 2:
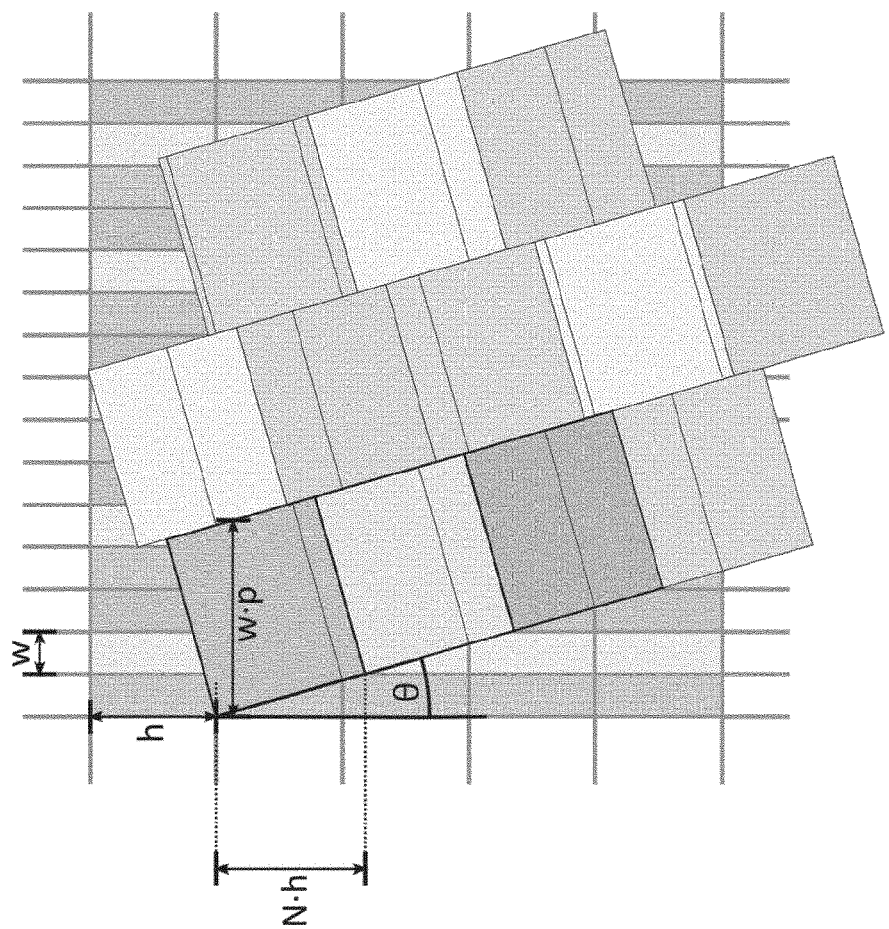
FIG. 2 illustrates an example of a lenticular screen overlaying a display panel of an autostereoscopic display.

The following description focuses on embodiments of the invention applicable to an autostereoscopic display used to display three dimensional images. However, it will be appreciated that the invention is not limited to this application but may be applied to many other applications, including for example stereoscopic displays based on view separating glasses.

The autostereoscopic display arrangement 301 comprises a display panel 303. The display arrangement 301 may contain a light source 307, e.g., when the display is an LCD type display, but this is not necessary, e.g., for OLED type displays.

The display arrangement 301 also comprises a view forming optical element 309 in the form of a lenticular sheet, arranged over the display side of the display panel 303, which performs a view forming function. The view forming optical element 309 comprises a row of lenticular lenses 311 extending parallel to one another, of which only one is shown with exaggerated dimensions for the sake of clarity. The lenticular lenses 311 act as view forming elements to perform a view forming function. The lenticular lenses of FIG. 3 have a convex facing away from the display panel. It is also possible to form the lenticular lenses with their convex side facing towards the display panel.

The lenticular lenses 311 may be in the form of convex cylindrical elements, and they act as a light output directing means to provide different images, or views, from the display panel 303 to the eyes of a user positioned in front of the display arrangement 301.

Figure 3:
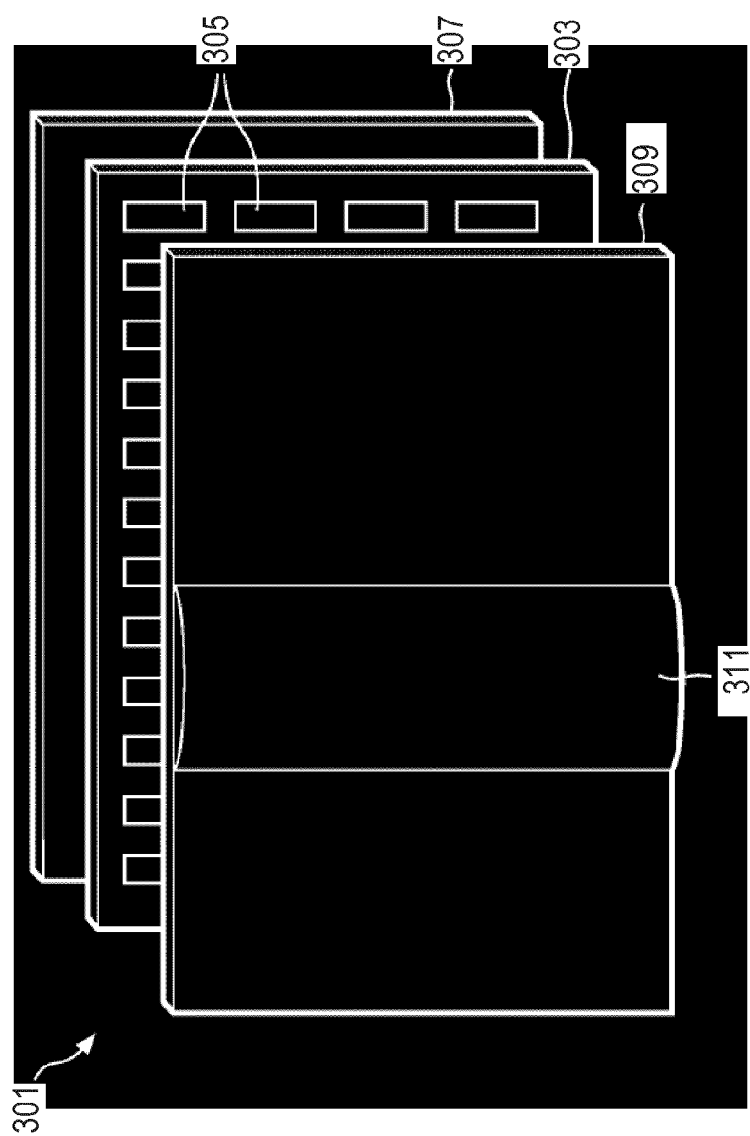
FIG. 3 illustrates a schematic perspective view of elements of an autostereoscopic display device.

The autostereoscopic display arrangement 301 shown in FIG. 3 is capable of providing several different perspective views in different directions. In particular, each lenticular lens 311 overlies a small group of display sub-pixels 305 in each row. The lenticular element 311 projects each display sub-pixel 305 of a group in a different direction, so as to form the several different views. As the user's head moves from left to right, his/her eyes will receive different ones of the several views, in turn.

Figure 4:
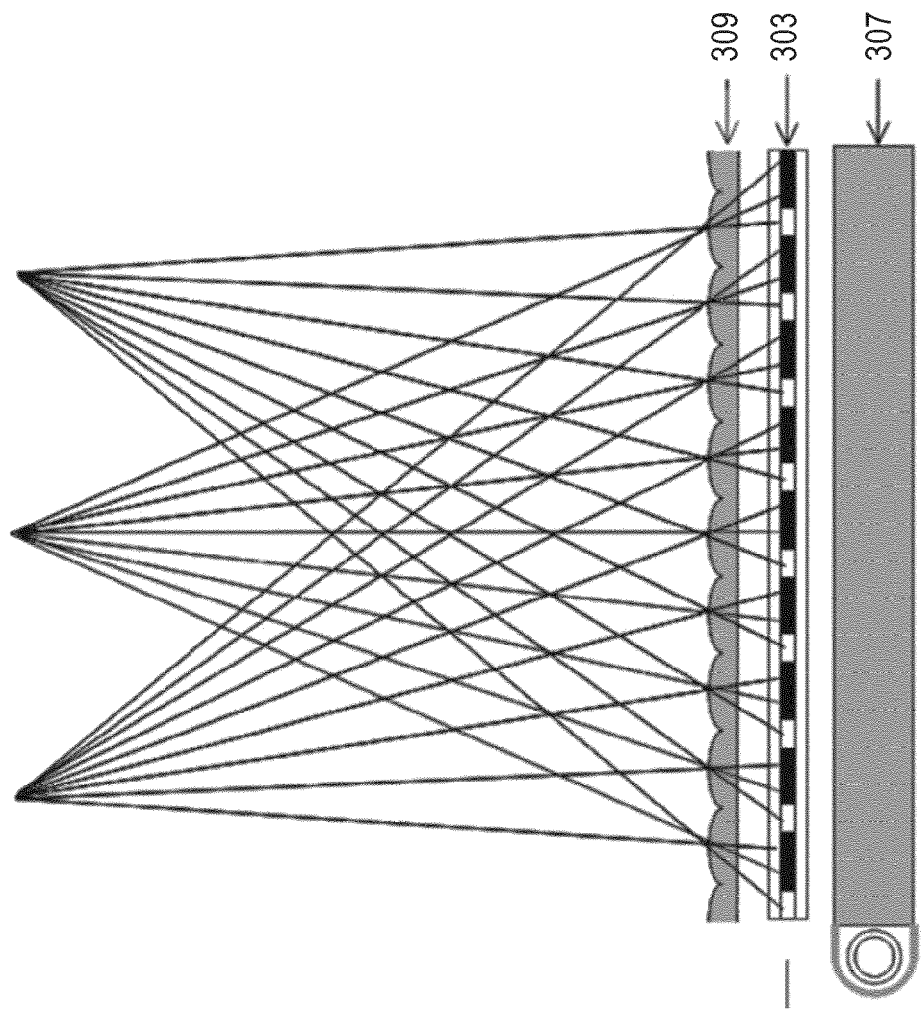
FIG. 4 illustrates a cross sectional view of elements of an autostereoscopic display device.
Figure 5:
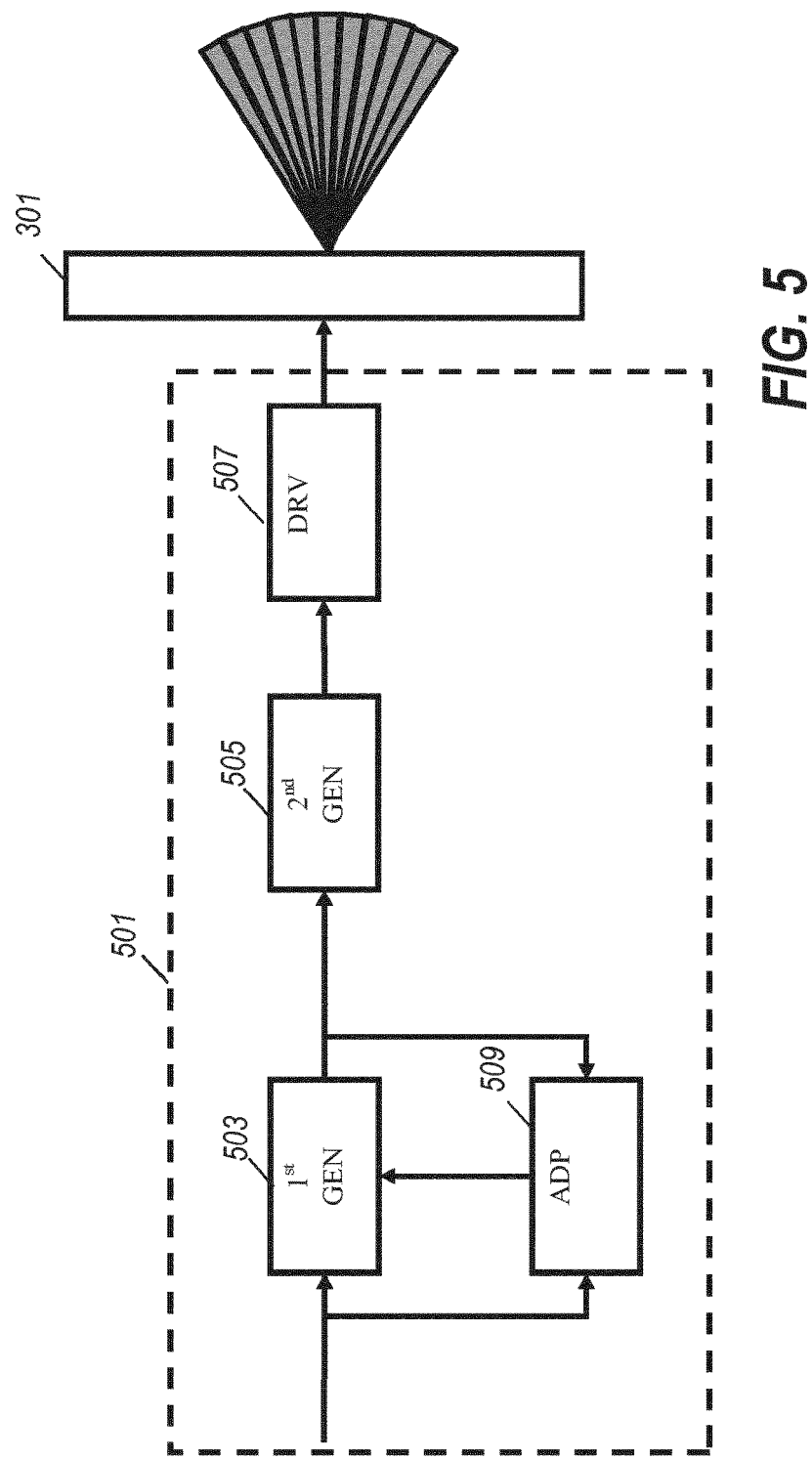
FIG. 5 illustrates an example of a display system in accordance with some embodiments of the invention.

FIG. 5 illustrates an autostereoscopic display in accordance with some embodiments of the invention. The autostereoscopic display comprises an autostereoscopic display arrangement 301 such as that described with reference to FIGS. 3 and 4. In addition, the autostereoscopic display comprises a display driver 501 which is arranged to generate a drive signal for driving the autostereoscopic display arrangement 301 such that this can present three dimensional images.

A three dimensional image may typically be any data providing (simultaneous) visual and depth information for a scene represented by the three dimensional image. Typically, at least some pixels of a three dimensional image will be represented by both a depth indication and a light output indication. The depth indication may for example directly be a depth value or a disparity value. The light output indication may typically be a set of values comprising at least one luminance and/or chroma value.

A three dimensional image may for example be a set of N images corresponding to different views/viewing angles. As another example, a three dimensional image may be a stereo image with one two dimensional image for the right eye and one two dimensional image for the left eye. As another example, a three dimensional image may be a single two dimensional image with an associated depth map (e.g. providing a disparity or depth value for each pixel of the single image). As yet another example, a three dimensional image may be a Z-stack with an associated depth map. One or more (possibly all) two dimensional images of a three dimensional image may be partial images. Thus, different two dimensional images of a three dimensional image may comprise image data for different regions/areas.

The display driver 501 comprises a first image generation unit 503 which is arranged to generate an intermediate three dimensional image. The first image generation unit 503 is coupled to a second image generation unit 505 which is arranged to generate an output three dimensional image from the three dimensional image data set received from the first image generation unit 503.

The second image generation unit 505 is coupled to a driver 507 which is arranged to generate a suitable drive signal for the autostereoscopic display arrangement 301. Specifically, the driver 507 receives the output three dimensional image from the second image generation unit 505 and proceeds to generate a drive signal causing the output three dimensional image to be rendered when the drive signal is fed to the autostereoscopic display arrangement 301.

The output three dimensional image comprises a number of view images where each view image corresponds to a (different) view direction. Each view image may provide a complete image of the scene from a given view direction. Specifically, the output three dimensional image may comprise a plurality of images of the scene from different viewing directions, and specifically from different viewing angles. In many embodiments, the output three dimensional image may comprise one view image for each view of the autostereoscopic display. For example, the autostereoscopic display may be a nine-view display, and the second image generation unit 505 may generate the output three dimensional image as nine images, with each image corresponding to the viewing angle for one of the views of the autostereoscopic display.

The first image generation unit 503 may generate the intermediate three dimensional image to comprise a plurality of two dimensional image blocks where each image block is generated for a given viewing direction. An image block may be a partial image, i.e. each image block may be an image part/fragment. An image block may be a group of pixels for which visual values are provided, and specifically a group of pixels for which light output indications, such as chroma and/or luminance values, are provided. The image data may specifically be pixel values Each image block may correspond to a viewing angle and represent part of a complete two dimensional image corresponding to that viewing angle. The intermediate three dimensional image may comprise a plurality of image blocks for a given viewing direction. For some viewing angles the image blocks may be sufficient to form a complete image. Thus, the intermediate three dimensional image may be generated to comprise a plurality of two dimensional images with each image corresponding to a given viewing direction and each image potentially being a partial image. In many embodiments, a subset of the two dimensional images are full images whereas other are only partial images (with the amount of image data provided typically being different).

Typically, a two dimensional image corresponds to a given pixel area/resolution, such as e.g. 1920×1080 pixels. For a three dimensional image each two dimensional image corresponding to a given view direction is represented by a given pixel area/resolution, and typically this is the same for all images in the three dimensional image. In the example of FIG. 5, the first image generation unit 503 may generate the intermediate three dimensional image to comprise image data for a plurality of viewing angles. For each viewing angle, the same pixel area/resolution is assigned. However, the first image generation unit 503 may not generate all of the images to be complete images, i.e. image data may only be provided for part of the image. Thus, for a given viewing direction the intermediate three dimensional image may comprise one or more image blocks containing image information and may also contain empty areas for which no image information is provided. Each image block may thus be a part of a view image. For example, the pixel area may be divided into a plurality of regions but image data may only be provided for a subset of these regions.

In many embodiments, the first image generation unit 503 may generate the intermediate three dimensional image to include a complete set of image blocks for one or more viewing angles. Thus, a complete view image is provided for these viewing angles. However, for other viewing angles, image data may only be generated for a subset of the regions.

The number, position, extent, shape, size etc. of the image blocks may be different for different viewing angles. Thus, the viewing angles for which image data is provided in the intermediate three dimensional image may be different for different regions/areas of the image.

Indeed, the first image generation unit 503 may generate an intermediate three dimensional image based on an image canvas of a given size (e.g. corresponding to the image resolution for each view image of the autostereoscopic display). For a given region (a region may e.g. be a single pixel or a group of pixels), the intermediate three dimensional image may comprise image data for a number of different viewing angles. This image data is provided in image blocks. The number of viewing angles for which there is provided image data, i.e. for which an image block is generated, may be different for different regions (e.g. for different pixels or pixel groups).

Equivalently, the intermediate three dimensional image may be considered to be formed by a number of two dimensional viewing direction images where each viewing direction image corresponds to a viewing direction. The two dimensional viewing direction images may be partial. Thus, image data may be provided in image blocks which form part of the image. Other parts of a two dimensional viewing direction image may be empty. The properties of image blocks may be different for different viewing direction images, specifically the size and/or position of image blocks included in a given viewing direction image may differ between viewing direction images. For example, for some viewing direction images the included image block may provide a complete image, i.e. there may be no holes/empty areas for some viewing directions. For other viewing directions, the viewing direction images may only contain one or a small number of small image blocks. Thus, some viewing direction images may be almost completely empty.

In many embodiments and scenarios, at least some image blocks may have a size exceeding 10, 100, 1000 or 1000 pixels, i.e. some image blocks may be formed by a group of at least 10, 100, 1000 or 1000 pixels.

The second image generation unit 505 is arranged to process the intermediate three dimensional image to generate the output three dimensional image. This processing typically includes generating a complete set of view images such that one full/complete view image is provided for each of the views of the autostereoscopic display arrangement 301.

The first image generation unit 503 is arranged to generate the intermediate three dimensional image based on a three dimensional processing. The first image generation unit 503 applies an algorithm to generate the image blocks for a given viewing direction where the algorithm includes a consideration of depth of different objects in the scene/image. Specifically, the first image generation unit 503 is arranged to generate the position of pixels representing different objects dependent on the depth of the object.

In some embodiments, the first image generation unit 503 may be arranged to generate the intermediate three dimensional image from an input three dimensional image. The input three dimensional image may for example be a relatively low data rate representation such as e.g. may correspond to two three dimensional images corresponding to a left eye view and a right eye view; or e.g. a single image or z-stack with an associated depth map.

The input three dimensional image may be received from any suitable internal or external source, such as from a local memory, from a storage media, from a remote network server, from a radio broadcast etc. In some embodiments, the input three dimensional image (as indeed the intermediate three dimensional image and the output three dimensional image) may be a single stationary image. In other embodiments, the input three dimensional image (as indeed the intermediate three dimensional image and the output three dimensional image) may be a single image (a single frame) of a three dimensional video sequence.

In such embodiments, the first image generation unit 503 may be arranged to generate the image blocks from the input three dimensional image by performing three dimensional processes including view shifting, de-occlusion, pixel shifting etc. as will be known to the skilled person.

For example, in order to generate an image block for a given viewing angle based on a input three dimensional image formed by a single two dimensional image and depth map, the first image generation unit 503 may select the pixels of the two dimensional image corresponding to a specific region. The horizontal pixel shift is then calculated for each pixel from the viewing angle and the depth of the pixels as indicated in the depth map. The pixels are then shifted by the calculated amount and any holes caused by the shift are filled in using a suitable de-occlusion approach (such as interpolation or extrapolation techniques). The resulting determined pixel values then correspond to the image block for the viewing angle.

In some embodiments, the intermediate three dimensional image may be generated by the first image generation unit 503 evaluating a three dimensional model (geometry) of a scene and associated textures and light sources, etc. For example, for a games application, the first image generation unit 503 may evaluate a three dimensional element and calculate image data for different viewing angles. In such examples, the intermediate three dimensional image may accordingly be synthesized by the first image generation unit 503 and is not based on an input image.

The amount of viewing angles for which an image block is generated for a specific region may differ for different regions. For example, for a subset of viewing angles for the views of the autostereoscopic display arrangement 301, a complete image may be calculated from the input image using appropriate depth based techniques. For example, for a nine-view autostereoscopic display, the first image generation unit 503 may generate image blocks corresponding to complete images for, say, five of the viewing angles.

The depth based processing is typically computationally very intensive and requires substantial computational power. Accordingly, it is advantageous to only calculate a subset of the required view images.

In addition to the full images, the first image generation unit 503 may further calculate image blocks for some additional viewing angles, and specifically may calculate one or more image blocks for viewing angles corresponding to the other four views of the autostereoscopic display. These image blocks may thus provide a partial image for one or more of the additional view images.

The second image generation unit 505 is arranged to generate the output three dimensional image comprising view images, and specifically may generate all the view images of the autostereoscopic display. In the specific example, the second image generation unit 505 may proceed to generate all nine view images based on the intermediate three dimensional image.

The processing of the second image generation unit 505 of FIG. 5 does not consider any depth information for the intermediate three dimensional image. Rather, it may perform a processing to generate the output three dimensional image which is not dependent on a depth of any object or pixel in the intermediate three dimensional image. The processing may be a two-dimensional processing of images resulting in low complexity.

Specifically, the second image generation unit 505 may generate at least some of the output three dimensional image in response to a combination of image blocks of the intermediate three dimensional image for different viewing angles. The combination may specifically be an interpolation between image data of image blocks for a region. The interpolation may typically be between the two image blocks that correspond to the two nearest view directions around the view direction for which the data is calculated. The interpolation may be a linear interpolation and the combination may thus be a direct linear weighted summation.

As a specific example, the first image generation unit 503 may generate a full image corresponding to the image direction of, say, views −3, 0 and 3 (with reference to FIG. 1). The second image generation unit 505 may now proceed to generate image data for view 2. If there are no other image blocks provided for a given region, the image data for that region can be generated by an interpolation between the image data of the view images for views 0 and 3. However, for another region, the intermediate three dimensional image may also include an image block for view 1. In that case, the first image generation unit 503 may proceed to generate the image data for view 2 by an interpolation between views 1 and 3.

The second image generation unit 505 may thus use a relatively low complexity and low computationally demanding process. In particular, the computational demand is typically substantially lower than that of the first image generation unit 503. However, due to the non-depth based processing, the process will typically only provide an approximation to the correct image for the view, and specifically will tend to introduce three dimensional artefacts due to the lack of depth consideration.

Accordingly, it is from an image quality point of view desirable to generate image data using the depth based processing of the first image generation unit 503 but from a computational resource point of view desirable to generate image data using the non-depth processing of the second image generation unit 505.

The autostereoscopic display of FIG. 5 further comprises an adaptor 509 which is arranged to adapt the number of image blocks generated by the first image generating unit 503 in a first region in response to a property of at least one of the intermediate three dimensional image and a representation of a three dimensional scene from which the first image generating unit 503 is arranged to generate the intermediate image. The representation may specifically be an input image or three dimensional model from which the intermediate three dimensional image is generated. In some embodiments, the adaptor 509 may be arranged to adapt the number of image blocks in response to an input image to the first image generating unit, and specifically to an image property for a neighborhood of the first region.

The following description will first focus on embodiments wherein the number of image blocks is adapted in response to a property (and specifically to an image property such as contrast or depth) in at least one of the intermediate three dimensional image or the input three dimensional image.

The first region may be a spatial region e.g. defined as a spatial region in a two dimensional (reference) image of the intermediate three dimensional image, or equivalently as a group of pixels (or sub-pixels) in a two dimensional (reference) image of the intermediate three dimensional image.

The first image region may be a part of the reference image, and may typically be less than e.g. 50%, 25% or 10% of the total image area. The first image region may be a part of the reference image, and may typically be more than e.g. 0.1%, 0.5%. 1%, 5% or 10% of the total image area. In many embodiments, the image(s) may be divided into a plurality of image regions (often at least 5 or 10 image regions and/or often no more than 50, 100 or 500 regions).

In many embodiments, the first region may have a size exceeding 10, 100, 1000 or even 1000 pixels of the reference image.

For clarity and brevity, the following description will focus on an approach wherein the adaptation is performed for a plurality of regions. It will be appreciated that the first region may be any of these regions.

Thus, in the system of FIG. 5, the number of viewing angles represented in the intermediate three dimensional image can be dynamically and locally adapted. It may be different for different regions. Specifically, for a given region, the intermediate three dimensional image may comprise a number of image blocks corresponding to different viewing directions/angles. The number of image blocks for a given region can be adapted by the adaptor 509 based on an image property, and specifically based on an image property for a neighborhood of the region. Thus, the number of viewing angles for which image information is generated by the first image generation unit 503 is adapted based on the local image properties.

Adapting the number of image blocks generated by the first image generation unit 503 based on local image properties allows the adaptor 509 to typically perform a dynamic and localized adaptation of the trade-off between computational resource usage and image quality. The more image blocks that are rendered by the first image generation unit 503, the higher the quality of the resulting view images generated by the second image generation unit 505 as more image information based on a full depth based calculation is available. However, the fewer image blocks rendered for a region, the lower the computational resource as the processing by the second image generation unit 505 to generate the missing information typically requires much lower computational resource than for a full depth based processing. In the following, the depth based rendering by the first image generating unit 503 will also be referred to as a rendering.

Thus, the adaptor 509 can perform a localized adaptation of the trade-off between calculating image data for a given view image based on a depth based rendering of the first image generation unit 503 and the non-depth based processing of the second image generation unit 505.

For example, a number of regions may be determined for the intermediate three dimensional image, and equivalently for the input three dimensional image.

The adaptor 509 may for example divide the intermediate three dimensional image into a number of regions and may for each region determine a local image property for the intermediate three dimensional image in a neighborhood of the region. The size and/or shape of the regions may be different in different embodiments, and may e.g. change dynamically e.g. in response to image characteristics.

For example, in some embodiments the adaptor 509 may segment the intermediate three dimensional image into various image segments (e.g. based on color and/or luminance as will be known to the skilled person). The segmentation may directly provide an identification of various image objects, or in some embodiments the determined segments may e.g. be combined into image objects.

As another example, the first three dimensional image may be divided into regions of predetermined size and position. E.g., the image may be divided into a grid of rectangular image regions of a predetermined size. Indeed, in many embodiments, each region may correspond to a single pixel.

A region may for example be defined with respect to one two dimensional image of the intermediate three dimensional image. For example, the region may be defined with respect to a central view image for the intermediate three dimensional image. In this image (or image canvas), regions may be defined as groups of pixels. Indeed, each pixel may be considered to be a region. In some embodiments, such a reference image may be divided into pixel regions, e.g. by a predetermined fixed division into a grid of rectangular pixel groups.

The adapter may then proceed to determine a suitable image property for each region where the image property is determined in a neighborhood of the region. The image property may be determined by analyzing the reference image, or may e.g. be generated by analyzing corresponding parts of other images of the intermediate three dimensional image.

For example, in some embodiments, the adaptor 509 may divide a reference image of the intermediate three dimensional image into a grid of rectangular pixel groups. For example, a 1920×1080 pixel may be divided into 64 regions each being formed by 240×135 pixels. For each of these regions, the adaptor 509 may determine a dominant color range for the pixels in a neighborhood of the region. The neighbourhood may specifically correspond directly to the region, and thus the image property determined for each region may be e.g. a median or average chroma value (e.g. the average UV values of a YUV color representation) of the pixels of the reference image in the region. In some scenarios, the chroma variance may also be determined.

Based on this average chroma (and optionally the variance), the adaptor 509 may determine the number of image blocks for the region, i.e. the number of different view angles for which image data is generated for the region by the first image generation unit 503. For example, the adaptor 509 may evaluate whether the average chroma is within a range considered to correspond to human skin tones. If so, and e.g. if the chroma variance is sufficiently low, the adaptor 509 designates the region as potential human skin region.

The adaptor 509 may then select the number of image blocks to generate for a region depending on whether this is designated as a potential human skin region or not. For example, for a potential human skin region, image blocks may be generated for all viewing angles of the autostereoscopic display arrangement 301. However, for all other regions, image blocks are only generated for a subset of the viewing angles. For example, nine image blocks corresponding to each viewing angle of a nine view autostereoscopic display may be generated for potential human skin regions whereas only three image blocks corresponding to e.g. views −3, 0 and +3 are generated for other regions.

In this way improved quality at the expense of computational resource is achieved for areas that are likely to correspond to human skin. This may for example improve image quality and three dimensional perception of e.g. human faces while still keeping the overall computational resource usage low.

It will be appreciated that the size and/or shape of the neighborhood in which the image property is determined may be different in different embodiments and scenarios and will depend on the specific requirements and preferences of the individual embodiment.

For example, the image property may often be determined to be e.g. a contrast measure or a depth measure in a neighborhood that is larger, and possibly substantially larger, than the region. For example, if each pixel corresponds to a region, the contrast measure may be determined by considering pixels in an area around the pixel. The area may e.g. be determined by a weighted spatial filter resulting in a soft transition.

In many embodiments, the neighborhood for a region may be a group of pixels having a distance to a pixel of the region of no more than e.g. 50, 100, 250, or 500 pixels. In many embodiments, the neighborhood for a region may be a group of pixels having a vertical distance to a pixel of the region of no more than 5%, 10% or e.g. 20% of the vertical dimension of the intermediate three dimensional image and having a horizontal distance to a pixel of the region of no more than 5%, 10% or e.g. 20% of the horizontal dimension of the intermediate three dimensional image. The vertical and horizontal dimensions may e.g. be measured as the vertical or horizontal pixel resolution, i.e. as the total number of pixel rows or columns for the image.

A neighborhood of a first region may be an area comprising at least one pixel belonging to the first pixel.

It will be appreciated that the determination of the image property may be based on the intermediate three dimensional image and that the image property may then be used to adapt which image blocks are generated for the intermediate three dimensional image. Thus, an iterative approach may be used wherein e.g. a part of the intermediate three dimensional image is first generated (such as the central image or another reference image). Based on this image, image properties may be generated for one or more regions. Based on the resulting image property, the adaptor 509 may then determine which additional image blocks to generate.

In the above description, the image property is determined based on the intermediate three dimensional image. However, it will be appreciated that the image property for a region need not be determined directly by evaluating or analyzing the intermediate three dimensional image but may e.g. be determined by analyzing a property which may provide an indication of an image property for the intermediate three dimensional image.

Specifically, in the example where the intermediate three dimensional image is generated from an input three dimensional image, there will be a close correspondence between the input three dimensional image and the intermediate three dimensional image. Indeed, in many embodiments, the image property may be generated by analyzing the input three dimensional image.

Indeed, it will be appreciated that there is a correspondence between regions in the intermediate three dimensional image and in the input three dimensional image. For example, for a region defined with respect to the central view image of the intermediate three dimensional image, a corresponding region may be considered to exist in the image(s) of the input three dimensional image. For example, if the image is given as a single central two dimensional image with an associated depth map, a group of pixels in the central image of the input three dimensional image may directly correspond to the same group of pixels in the two dimensional image of the input three dimensional image.

In scenarios where there is an angle difference between a reference image with respect to which the regions are defined, and an image of the input three dimensional image or the intermediate three dimensional image based on which the image property is determined, the corresponding disparity may be taken into account. For example, the image property for a region of a central image of the intermediate three dimensional image may be determined by evaluating the image characteristics of another image in a region which is shifted to reflect a difference in viewing angle between the images. In some scenarios, however, such a shift may not be compensated for and the same areas are simply considered (e.g. if the shift is considered to be sufficiently small compared to the neighborhood in which the image property is determined, or if the section includes complete pixel rows).

It will also be appreciated that an indication of an image property for a region of e.g. an image defined with respect to one viewing direction (e.g. the central or reference image) can be determined by considering data for other viewing directions. For example, a depth indication for a pixel in the central image can be determined by measuring a disparity between pixels of two images for viewing angles on each side of that of the reference central image (and indeed these two images could be two dimensional images of the intermediate three dimensional image or of the input three dimensional image, e.g. they could be an input left eye and right eye image).

In some embodiments, the image property may specifically be a neighborhood depth measure. The adaptor 509 may be arranged to determine the number of image blocks for the first region in response to a depth measure for a neighborhood of the first region. The depth measure for a region is indicative of a depth characteristic in a neighborhood of the region.

In some embodiments, the image property may specifically be a neighborhood contrast measure. The adaptor 509 may be arranged to determine the number of image blocks for the first region in response to a contrast measure for a neighborhood of the first region. The depth measure for a region is indicative of a contrast characteristic in a neighborhood of the region.

In many embodiments, the adaptor 509 may advantageously be arranged to determine the number of image blocks for the first region in response to both a contrast measure and a depth measure for a neighborhood of the first region.

It will be appreciated that the size of the neighborhood in which the measure is determined need not be the same as the size of the region but may be both larger and smaller than this. The neighborhood used for determining the depth measure and the contrast measure may be the same or may be different.

For example, the contrast measure may often be determined to reflect luminance or color channel intensity value variations in a neighborhood that is larger, and possibly substantially larger, than the region. For example, if each pixel corresponds to a region, the contrast measure may be determined by considering pixels in an area around the pixel. The area may e.g. be determined by a weighted spatial filter resulting in a soft transition.

As another example, the depth measure may in many embodiments be determined as e.g. an average or weighted depth value for pixels in a neighborhood of the region. E.g. for a region corresponding to one pixel, the depth measure may be an average depth value for an area around the pixel. Typically, the depth measure is calculated to include some spatial filtering or averaging. For example, if the region corresponds to an image segment or object, the depth measure may be calculated as the average, minimum, maximum or median of all depth levels within the region. In some embodiments, the neighborhood is smaller than the region. For example, if a large image segment is identified, the depth measure may be generated as an average depth level for pixels around a center of the image segment.

The depth may often be represented by disparity values, and as such, the values may reflect a distance to the reference screen level plane. This may be attractive in many scenarios as the amount of perceivable artefacts and the amount of degradation by using non-depth based processing typically relates better to disparity values than to continuous z-value depths. For example, infinite depth may correspond to a pixel disparity of, say, 65 mm. The amount of artefact/blurring caused for such depth ranges tends to be better represented by a depth scale of [0; 65 mm] than of [0; ∞]. Examples of possible depth measures include e.g. the average, median, maximum, or root-mean-square (RMS) of disparity values.

It will be appreciated that the depth measure need not be determined or calculated as a single depth value. For example, the disparity between regions directly depends on the depth of the region, and as the disparity may be reflected by how similar (or not) the corresponding image areas are, this may provide a suitable depth indication/measure. Thus, explicit calculation/estimation of individual depth values is not necessary. Rather, instead, the system may receive a three dimensional image comprising multiple views rather than explicit depth values (e.g., no depth map may be received). In such a case, the difference between views is indicative of the depth and may be used. For example, the system may be arranged to evaluate the received views and to adapt the number of image blocks based on the difference between the image content of this view (in the neighborhood of the region) and the corresponding image content of (typically) the neighbor view.

In some embodiments, the depth values may directly be available to the adaptor 509, for example by the first three dimensional image being provided as an image with a depth or disparity map. In other embodiments, such as when the input three dimensional image is formed by multiple images corresponding to different viewing angles, depth values may first be calculated from the received images. For example, a disparity map may be generated from a comparison of two images. The local depth measure may then be calculated from the generated disparity map, e.g. by applying a spatial filtering providing an averaging effect.

In many embodiments, the depth measure may be indicative of a depth deviation from a reference depth corresponding to the display screen level, i.e. corresponding to the depth for which there is no disparity in the projected image for different views. Thus, the depth measure may be an indication of a deviation of depth in a neighborhood of the region from a reference screen level depth. In some embodiments, depth may directly be represented by disparity values, and thus the depth is directly provided relative to a depth corresponding to zero disparity.

The adaptor 509 may e.g. generate a local contrast measure for a region where the local contrast measure is indicative of the brightness/intensity variation in a neighborhood of the pixel (e.g. the luminance variation for pixels or the intensity within a single color channel).

Thus, a contrast measure may e.g. be generated for a neighborhood around the pixel/segment. The neighborhood may e.g. be considered to be a predetermined area around each pixel, or may e.g. be determined dynamically. For example, the size of the neighborhood may be dynamically changed based on e.g. the depth value of the pixel, the average brightness level etc. It will be appreciated that the neighborhood may have sharp borders or may have a gradual transition. It will also be appreciated that the adaptor 509 need not explicitly determine a region but that this may typically be inherent in the algorithm used to determine the contrast measure.

The adaptor 509 may use any suitable algorithm for determining the contrast measure. For example, in some embodiments, a spatial high pass filtering may be performed, followed by spatial averaging to generate an indication of the local luminance variation. As another example, image transitions (luminance and/or chroma) may be identified and the contrast measure may be determined as a gradient of the transition. The measure of the local contrast may in some embodiments be as simple as the (e.g. perceptually weighted) brightness difference between the current pixel and a neighborhood of pixels.

As another example, the contrast measure may e.g. be generated as a contrast estimate based on a luminance and/or color distance measure between neighboring views. Suitable color distance measures include sum of absolute differences (SAD), sum of squared differences (SSD), and approximations of perceptual distance such as $L^*a^*b^*\Delta E$, preferably of a band-filtered signal (S-CIELAB).

In many embodiments, the adaptor 509 may be arranged to generate the contrast measure as a horizontal contrast measure. Thus, the luminance or intensity variations in the horizontal direction may be considered whereas the luminance or intensity variations in the vertical direction may be substantially ignored.

This may in many embodiments provide improved performance and may in particular allow the image block adaption to be more closely adapted to the image as perceived. In particular, due to the three dimensional effect introducing horizontal, but not vertical, displacement and disparity, the impact of high contrast areas may introduce significant visual artifacts if the transitions occur in the horizontal direction but not if it occurs in the vertical direction. The inventors have realized that by specifically considering horizontal contrast, the quality improvement possible by locally adapting the depth and/or tone mapping may be increased significantly.

The image transformer 505 is accordingly arranged to locally adapt the number of viewing angles for which image data is generated by the full depth based processing by the first image generation unit 503 in response to a local contrast and/or depth measure. Specifically, the adaptor 509 may be arranged to increase the number of image blocks corresponding to different viewing directions for an increasing contrast measure and/or depth measure (i.e. for the measures indicating increasing contrast or depth). The number of image blocks may be a monotonically increasing function of the contrast measure and/or a monotonically increasing function of the depth measure.

The system of FIG. 5 may provide improved trade-off between image quality (including an improved three dimensional experience and perception) and computational resource usage. Specifically, in many scenarios an improved image quality is achieved for a given computational resource usage and/or a reduced computational resource usage is achieved for a given image quality. This may specifically be achieved by locally adapting the amount of viewing angles for which specific image data is generated by a depth based processing in dependence on local contrast and/or depth.

In particular, the inventors have realized that dynamically adapting the number of image blocks for a given region, the impact of degradation introduced by determining image data for different views from simple interpolation or similar non-depth based approaches can be minimized. Basing the adaptation on local depth and/or contrast in particular allows the computational resource to be focused on areas which are most likely to be sensitive to a simplified processing.

Figure 6:
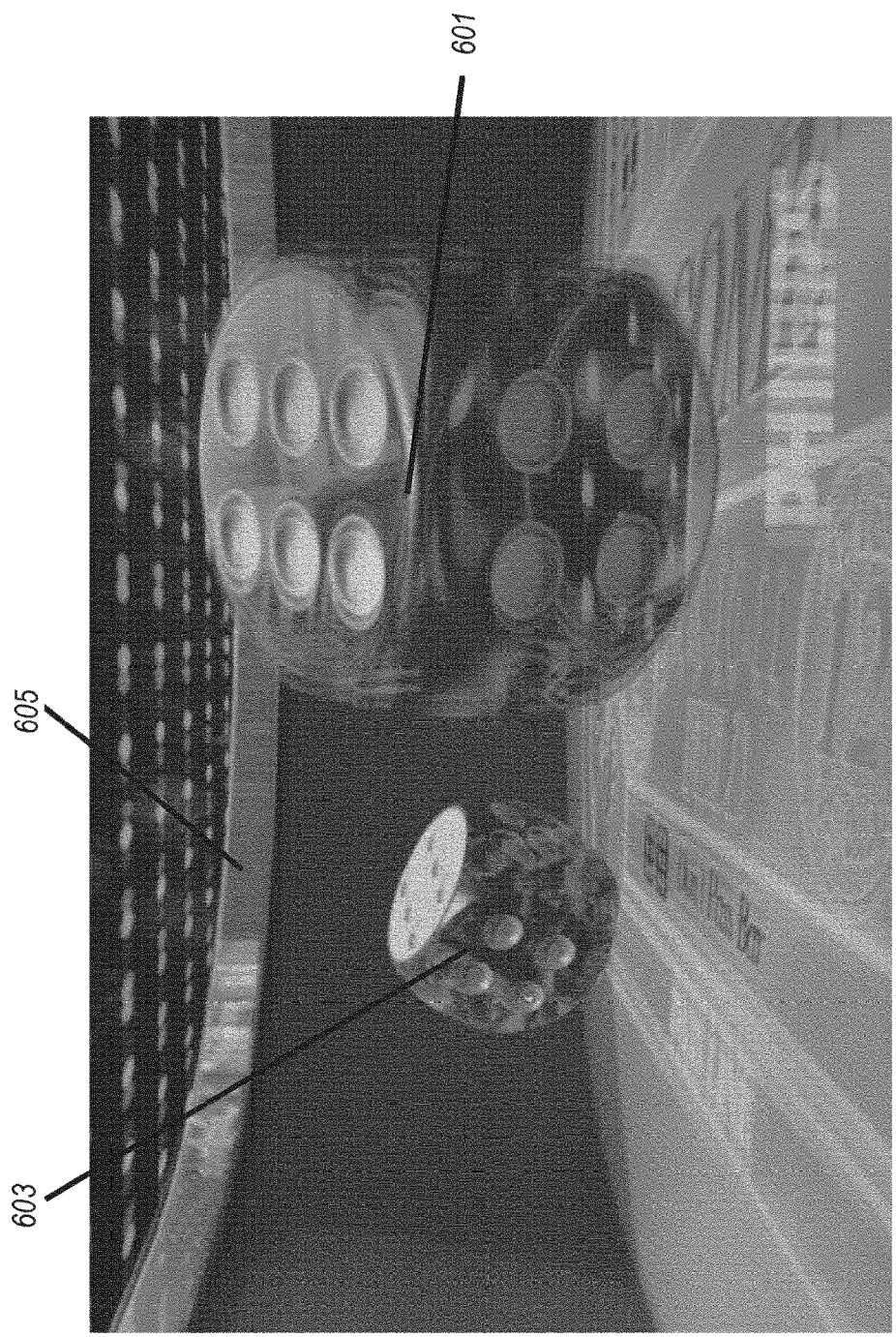
FIG. 6 illustrates an example of a projected view image from an autostereoscopic display.

This may be illustrated by considering the example image of FIG. 6. The example illustrates cross-talk artifacts, and specifically ghosting, for an image. In the image, a first area 601 can be seen wherein the contrast and depth deviation are quite high. In the area, a high degree of ghosting can be seen which substantially reduces the perceived image quality. In contrast, another image area 603 is substantially at the reference depth level, i.e. there is substantially no depth deviation. In this area, there is virtually no ghosting despite a relatively high degree of contrast, and thus virtually no cross-talk artifacts. In yet another image area 605, the depth deviation is quite high but the contrast level is very low. In this area, the ghosting effect may be present but does not generate very visible artifacts. Thus, as can be seen, high degradation occurs when depth deviation and contrast is high whereas low degradation occurs when depth deviation and contrast is low.

The inventors have realized that the existence and perceptual significance of degradations caused by simplified processing can be controlled by locally adapting the balance between complex depth based processing and simplified non-depth based processing based on local contrast and depth measures. Indeed, this approach may allow sections that are particularly perceptually sensitive to be identified such that the available computational power can be focused thereon.

It can be considered that the depth indicates how much disparity and offset there is between images of different views, i.e. it may be considered to be an indication of how similar or different the images of different views are. As such, the depth can be perceived as an indication of the perceptual significance of the full depth based processing. Similarly, the local contrast may be seen as an indication of how different the images are in the visual (luminance/chroma) domain, and thus may be seen as an indication of the how large errors may be introduced e.g. by simple interpolation.

Accordingly, by jointly considering local depth and contrast, a particularly good indication of how significant the degradation may be in a specific area may be obtained. The two measures thus synergistically provide a good indication of the perceptual impact, and may provide information that more accurately represents the perceptual impact than when considering only one parameter. Specifically, it may allow critical areas to be identified more accurately.

Accordingly, in some embodiments, the adaptor 509 is arranged to locally adjust the number of rendering pipes used by the first image generation unit 503 to generate image blocks depending on the local depth and contrast. When depth deviation from the display reference plane (corresponding to no disparity between views) increases (behind or in front of the screen), neighboring views become more and more separated, i.e. pixel disparities increase. By generating more image blocks for increasing disparities, it can be achieved that the disparity between two adjacent images is kept low thereby allowing improved interpolation by the second image generation unit 505. In the described approach, the shift of a pixel between adjacent views may e.g. be maintained lower than a given threshold by creating additional image blocks if the disparity between the current image blocks for the region is too high. Instead of increasing the number of rendered views for the entire image/sequence, the approach may increase it only in the areas with large depth thereby reducing the computational resource usage.

This shift between adjacent views is more visible in areas with high contrast than in areas with low contrast. Indeed, if the contrast is low, the resulting interpolation value is likely, to not differ much from one generated by full three dimensional processing. Accordingly, it may not be necessary to generate extra image blocks even if the disparity is relatively high.

In some embodiments, the adaptor 509 may be arranged to determine the number of image blocks generated by the first image generation unit 503 for at least one region of the plurality of regions in response to a computational resource availability for the first image generating apparatus.

Indeed, in many scenarios, the adaptor 509 may select the number of image blocks for the intermediate three dimensional image such that a total computational resource demand approaches, but does not exceed, a given computational resource availability.

As an example, the display driver 501 may in real time process input three dimensional images that are part of a video sequence. Thus, for each frame, an input three dimensional image is received and an output three dimensional image is generated. The first image generation unit 503 may be arranged to generate a predetermined number of N view images where each view image is generated for a viewing angle of the autostereoscopic display arrangement 301, where N is smaller than the total number M of views of the autostereoscopic display arrangement 301.

For example, for an M=15 view autostereoscopic display arrangement 301, the first image generation unit 503 may be arranged to always generate, say N=3 full view images from the input three dimensional image of the frame (which e.g. may be provided as a two dimensional image with an associated depth map).

The computational resource required for this processing may be estimated relatively accurately (or at least a maximum computational resource may be estimated). In addition, the first image generation unit 503 may have additional spare available resource, and the amount of spare resource may be known, estimated or assumed by the adaptor 509. For example, the processing of the first image generation unit 503 may assume that the spare resource is sufficient to generate, say K=100 extra image blocks for each frame. (K may e.g. be dynamically adapted by the adaptor 509).

The adaptor 509 may accordingly for each region determine the depth and contrast measure and may generate a combined significance measure for the region, where the significance measure reflects both local contrast and depth. The adaptor 509 may then proceed to prioritize the regions and determine the number of image blocks that are to be generated for each region based on the significance measure for the region. For example, if the significance measure is sufficiently high, it may be determined that the first image generation unit 503 should generate an image block for each viewing angle of the autostereoscopic display arrangement 301. For lower values of the significance measure, it may e.g. be determined that an image block is generated for every other view direction resulting in five extra image blocks being generated for this region.

The adaptor 509 may in this way proceed to allocate image blocks to regions until the resource pool has been used, i.e. in the specific example, until 100 image blocks have been allocated. In this way, the adaptor 509 may focus the available resource on the specific parts of the image where depth based processing has the most significant effect.

Thus, in some embodiments, the adaptor 509 may implement a prioritization mechanism which allocates resource for K image blocks dependent on local depth and contrast measures, where K is a number of image blocks that are known or expected to be computable by the available hardware resources. The number K can be fixed or e.g. estimated at run-time in a timed feedback loop. In some embodiments, a threshold λ may be estimated such that about (or at most) K significance (or depth or contrast) measures are bigger than λ. The first image generation unit 503 may then process the input three dimensional image and generate additional image blocks for those regions wherein the significance (or depth or contrast) measures exceed the threshold λ.

In many embodiments, at least one, and typically all, of the regions may be formed by one or more pixel rows. Thus, in such an embodiment a region will not include only part of a pixel row, but rather the entire pixel row will either be included or no pixels from the pixel row will be included. As a specific example, the regions may be generated by dividing the central two dimensional image of the intermediate three dimensional image into pixel rows, i.e. each row of pixels may form one region and equivalently each region is formed by one pixel row. In other embodiments, a lower number of regions may be generated with one or more of the regions comprising a plurality of adjacent pixel rows.

It will be appreciated that in other embodiments, the regions may not need to be formed by entire pixel rows but may indeed include one or more regions for which only a subset of pixels of a pixel row are included. This may provide additional flexibility and allow a finer granularity in the selection of areas for which to generate additional image blocks. This may reduce the computational resource in some embodiments.

However, the use of regions based on entire pixel rows may be particularly advantageous in many embodiments. Specifically, three dimensional processing, such as view shifting, de-occlusion etc. are based on horizontal disparities, and accordingly on pixel row based processing. In many embodiments, the difference in computational resource usage between processing an entire pixel row and processing only part of a pixel row may be quite small. Indeed, in many scenarios, the additional resource required to divide pixel rows into smaller sections, determine measures for each section, evaluate each section etc. may be substantially higher than the extra resource required for processing the entire pixel row. Accordingly, basing the regions on entire pixel rows may often not only reduce complexity but may also reduce overall resource usage.

Furthermore, not only is the depth based processing typically a row-wise operation thereby reducing complexity and resource usage, but the approach may also typically result in improved image quality. For example, edge-like artifacts could be generated when some pixels of a pixel row are disparity shifted while neighboring pixels are not.

As previously mentioned, an iterative approach may be used in some embodiments.

As an example, the first image generation unit 503 may first proceed to generate image blocks for all regions for a first number of view directions. By generating image blocks for all regions for one view direction, a complete image for the view direction is generated. The first image generation unit 503 may proceed to initially generate a number of such complete view images. For example, as in the previously mentioned example, the first image generation unit 503 may generate N=3 complete view images for a M=15 view autostereoscopic display arrangement 301.

Subsequently, the autostereoscopic display arrangement 301 may proceed to generate a depth measure for each of the regions, such as e.g. for each pixel row. The depth measure may be generated based on the already generated view images. Specifically, the disparity between the generated view images for the individual regions may be determined. E.g. for a row based approach, the maximum or average (or e.g. RMS) disparity may be determined for each row based on the image blocks already generated, i.e. based on the pixel rows of the generated view images.

The adaptor 509 may then proceed to select regions for which further image blocks corresponding to new views should be generated based on these disparities. For example, the first image generation unit 503 may have spare capacity to process an additional 200 pixel rows for an intermediate three dimensional image for which each view image has a vertical resolution of, say, 1080 pixel rows. It may then proceed to select the 200 pixel rows with the highest disparity measure. For these pixel rows, additional image blocks corresponding to the remaining view directions of the autostereoscopic display arrangement 301 may be generated.

It will be appreciated that the adaptor 509 may not generate image blocks for all views of a selected region. For example, in some embodiments, the adaptor 509 may arrange for image blocks to be generated for all views of the autostereoscopic display arrangement 301 for regions for which the depth measure or contrast measure is above a first threshold, for every other view for regions for which the depth measure or contrast measure is below the first threshold but above a second threshold, for every third view for regions for which the depth measure or contrast measure is below the second threshold but above a third threshold, etc.

In some embodiments, the adaptor 509 may be arranged to select a region for which to generate an image block for an additional viewing angle in response to a disparity measure for that region exceeding a threshold. The disparity measure may be a measure of disparity for two image blocks already generated for two adjacent viewing angles. If the disparity measure exceeds the threshold, the adaptor 509 proceeds to control the first image generation unit 503 to generate an extra image block for a view direction between the two adjacent view directions for which the measure was generated. Typically, an image block for the midway viewing angle may be generated.

For example, for a given pixel row, the adaptor 509 may analyze all pairs of image blocks already generated. If any such pair results in a disparity value (e.g. an average, maximum or RMS disparity) which exceeds a given threshold, the adaptor 509 may control the first image generation unit 503 to generate image data for the pixel row for a view angle which is midway between the view angle for the pair of image blocks. In this way, a new pixel row image block is generated whenever the disparity between two adjacent image blocks is too high. The process may for example be iterated for each pixel row until all disparities between adjacent image blocks are below a threshold. The approach may further be performed for all pixel rows thereby ensuring that the depth based processing of the first image generation unit 503 provides image data for which the maximum disparity is below the threshold.

Thus, it will be appreciated that the number of image blocks generated for a region need not be explicitly determined by the adaptor 509 followed by this number of image blocks being generated, but that e.g. an iterative process of continuously generating additional image blocks dependent on e.g. a disparity difference of existing image blocks will result in a different number of image blocks being generated for the regions as a function of a local image property.

As another example, the adaptor 509 may first determine a disparity measure for each pixel row of each pair of image blocks with adjacent/neighboring viewing angles/directions. It may store all the generated disparity measures in a table ordered as a function of size of the disparity measure. It may then select the largest calculated disparity measure and proceed to control the first image generation unit 503 to generate an additional image block for a viewing angle between the viewing angles of the two image blocks. The maximum disparity measure may then be deleted, and instead a disparity measure may be calculated for each of the two new adjacent image block pairs. These two new disparity measures may be added to the table of disparity measures. The adaptor 509 may then repeat the process of selecting the pair of image blocks with the maximum disparity measure, generating a new image block between this pair, deleting the previous disparity measure and adding the two new ones. This process may be repeated until no more processing time is available. Thus, in such an approach, the adaptor 509 may proceed to always allocate the resource to the specific area where the disparity is highest. As a result, the computational resource is focused on the section likely to be the most critical.

In some embodiments, the adaptor 509 may be arranged to determine a subset of regions for which a depth measure is below a threshold. For example, for an input image comprising a single two dimensional image and associated depth map, the adaptor 509 may determine a maximum depth for each pixel row by scanning the depth map. The maximum depth may be compared to a threshold, and all the pixel rows for which the maximum depth is below the threshold may be identified.

The adaptor 509 may then proceed to control the first image generation unit 503 to generate only one image block for the identified regions. Thus, for the identified pixel rows, the intermediate three dimensional image is generated to only include one image object, i.e. pixel values are provided for only one view direction. The view direction may specifically correspond to a central view of the autostereoscopic display arrangement 301 and may e.g. be generated simply by copying the corresponding pixel values from the corresponding row of a two dimensional image of the input three dimensional image.

Thus, in this approach, a number of regions are identified for which the depth is sufficiently low, and for these regions only a two dimensional output is generated for the intermediate three dimensional image. Accordingly, for these regions, the second image generation unit 505 will proceed to generate the same image data for all views of the autostereoscopic display arrangement 301, and specifically it may simply copy the image data from the intermediate three dimensional image. Thus, in the example, pixel rows for which there is very low depth are presented by the autostereoscopic display arrangement 301 as flat two dimensional regions.

This approach may not only reduce computational resource usage substantially but may also provide improved image quality in many scenarios as e.g. cross talk may be reduced. This improvement may be achieved on account of a reduced three dimensional effect but as it is specifically performed for image regions that are considered sufficiently flat, this may be acceptable and indeed preferable in many embodiments and applications.

The previous description has focused on embodiments where the intermediate three dimensional image is generated from an input three dimensional image. However, as mentioned, in some embodiments, the first image generating unit 503 may instead (or possibly additionally) be arranged to generate the intermediate three dimensional image by evaluating a graphical three dimensional model. Thus, in some embodiments, the first image generation unit 503 may be arranged to generate the intermediate three dimensional image based on a three dimensional model of a three dimensional scene.

For example, a graphical three dimensional model may typically be used for e.g. a gaming application and indeed many games are currently based on use of a three dimensional scene geometry, textures and light sources. In such scenarios, a virtual perspective camera is used with the three dimensional model to synthesize a view of the scene depending on the user's input during gaming.

In the following, some embodiments will be described which are specifically related (but not limited) to the use of the OpenGL standard for three dimensional graphics. Specifically, a graphics card may be controlled via an OpenGL application interface. The OpenGL Shading Language adds flexibility in using a graphics card for rendering via OpenGL. In the following, an approach is described which may use existing OpenGL mechanisms to selectively draw only part of a scene to a memory buffer, thereby saving computations. Specifically, the OpenGL mechanisms are used to generate the intermediate three dimensional image with different image blocks for different regions, and with a subsequent output three dimensional image then being generated from the intermediate image.

In the following examples, the viewing angles for the intermediate three dimensional image and the viewing angles for the output three dimensional image are the same, and specifically viewing angles correspond to the viewing angles for the autostereoscopic display arrangement 301. Thus, the image blocks of the intermediate three dimensional image are generated for the viewing angles of the autostereoscopic display arrangement 301. However, in the example, the output three dimensional image is generated to comprise a full two dimensional image for each viewing angle of the autostereoscopic display arrangement 301 (i.e. for each view) whereas the intermediate three dimensional image is generated to comprise only partial images for at least some of the viewing angles. In other words, image blocks for the intermediate three dimensional image may only be generated by the first image generation unit 503 for some viewing angles in some regions.

In the example, the first image generation unit 503 and the second image generation unit 505 uses the same image buffers. Specifically, the apparatus may comprise an image buffer for each viewing angle of the autostereoscopic display arrangement 301. The first image generation unit 503 may then first generate image blocks and store these in the appropriate buffers. For a given region, image blocks may accordingly be generated for one or more viewing angles of the autostereoscopic display arrangement 301 and stored in the corresponding buffer(s). The number of viewing angles and thus buffers for which the first image generation unit 503 generates image blocks will be different for different regions (e.g. typically depending on the depth and/or contrast in the region).

Figure 7:
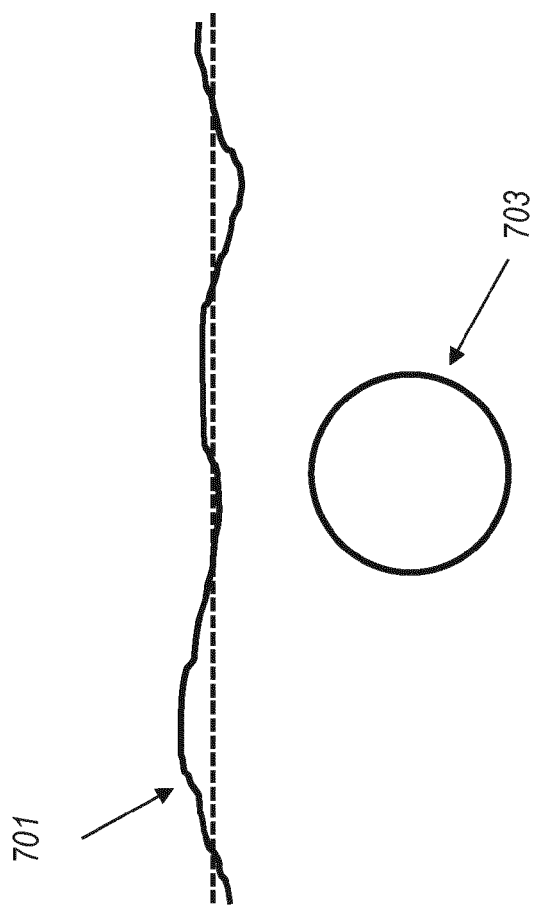
FIG. 7 illustrates an example of a three dimensional scene with two objects.

FIG. 7 illustrates an example of a three dimensional scene with two objects.

The geometry of the first object 701 is close to the reference depth, i.e. to the display depth, and therefore has only small parallax/disparity. For this geometry, the first image generation unit 503 may generate only image blocks for only a single viewing angle typically corresponding to the center view, and then use this for all views of the output three dimensional image. Indeed, as the disparity is very low, it is acceptable to use the same perspective for all views, thereby effectively reducing the object geometry to a plane when viewed on an (auto)-stereoscopic display.

The first image generation unit 503 may perform the following operation:
1. Set near and far clipping plane to include only first object 701;
2. Set viewport in OpenGL to correspond to the center view number;
3. Render the scene.
4. Store the resulting data for the first object in the center view image buffer.

In this way, the first image generation unit 503 thus generates a single image block for regions wherein the first object 701.

The second image generation unit 505 may then generate the corresponding pixels of the output three dimensional image by simply copying the image data from the center view image buffer to the image view buffers from all other views.

However, the scene may also contain a second object 703 which is far from the reference depth, and which thus has a high degree of parallax/disparity. For this object, different approach is used. Specifically, the first image generation unit 503 may perform the following steps:

1. Set the near and far clipping planes to include only the second object 703;
2. Loop over all views of the autostereoscopic display arrangement 301, and for each loop:
a. Set viewport in OpenGL to correspond to the current view;
b. Render the scene for this view using the correct perspective;
c. Store the resulting image data for the second object 703 in the image buffer for the current view.

In this way, the first image generation unit 503 may generate image blocks for all the possible viewing angles. Thus, for these image blocks, the second image generation unit 505 may generate the output three dimensional image by directly using the image blocks already generated by the first image generation unit 503 and stored in the correct buffers.

Figure 8:
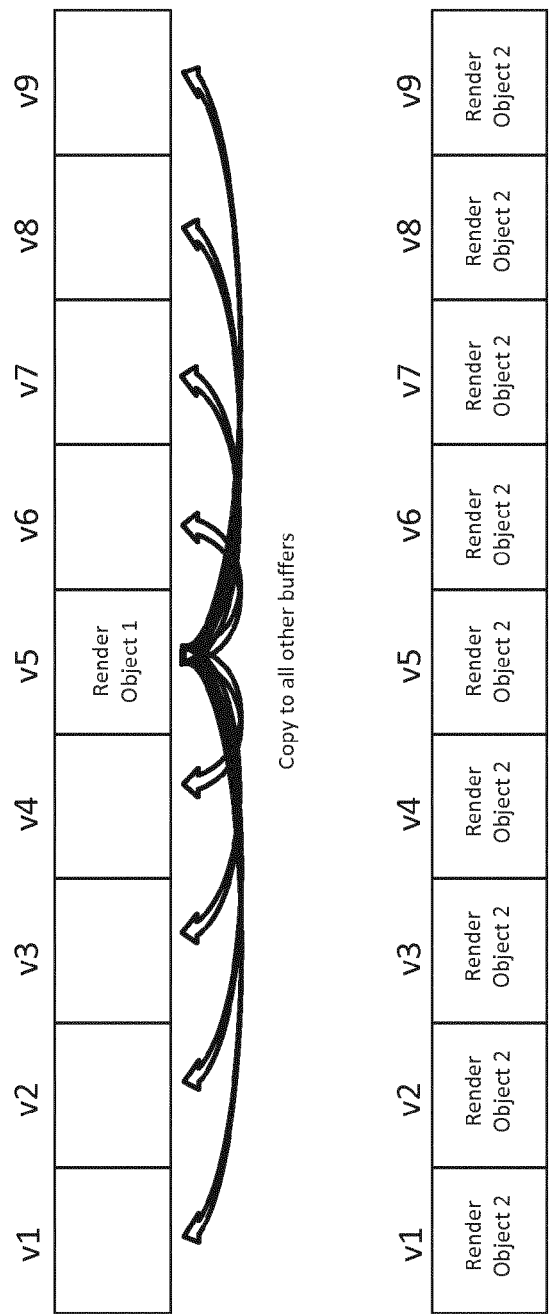
FIG. 8 illustrates aspects of an exemplary approach for generating an output three dimensional image in accordance with some embodiments of the invention.

FIG. 8 illustrates the different exemplary approaches.

Figure 9:
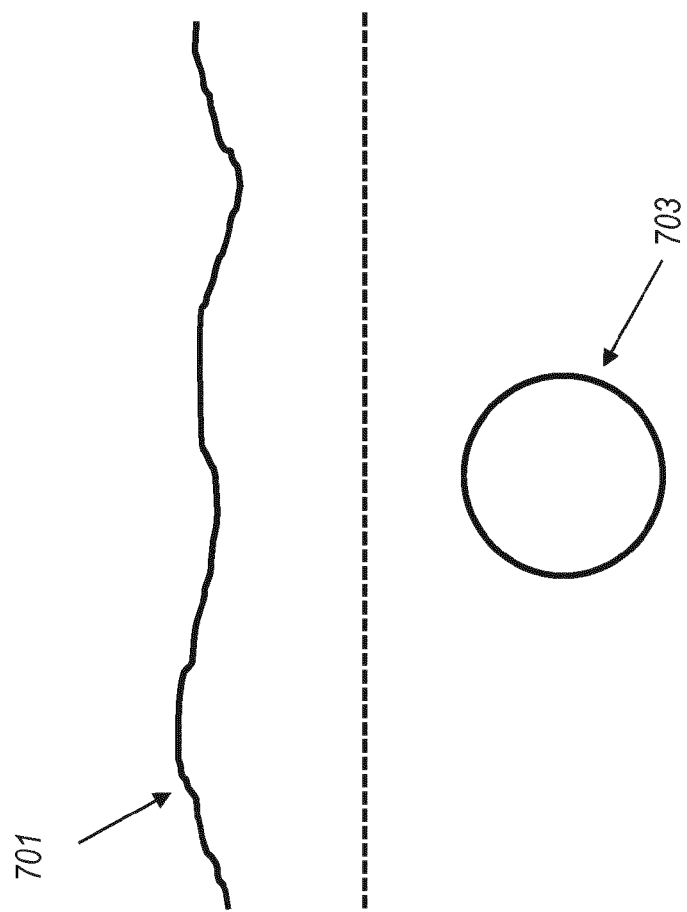
FIG. 9 illustrates an example of a three dimensional scene with two objects.

In some embodiments, the second image generation unit 505 may be arranged to add a fixed parallax when copying image blocks from the center view to the other views in the first example (for the first object 701). This may allow the second image generation unit 505 to position the first object 701 for instance on a plane behind the screen instead of at screen depth. The situation is illustrated in FIG. 9. In order to introduce this parallax and depth shift, the copy operation performed by the second image generation unit 505 may introduce horizontal shift by a given depending on the intended depth for the first object 701.

Figure 10:
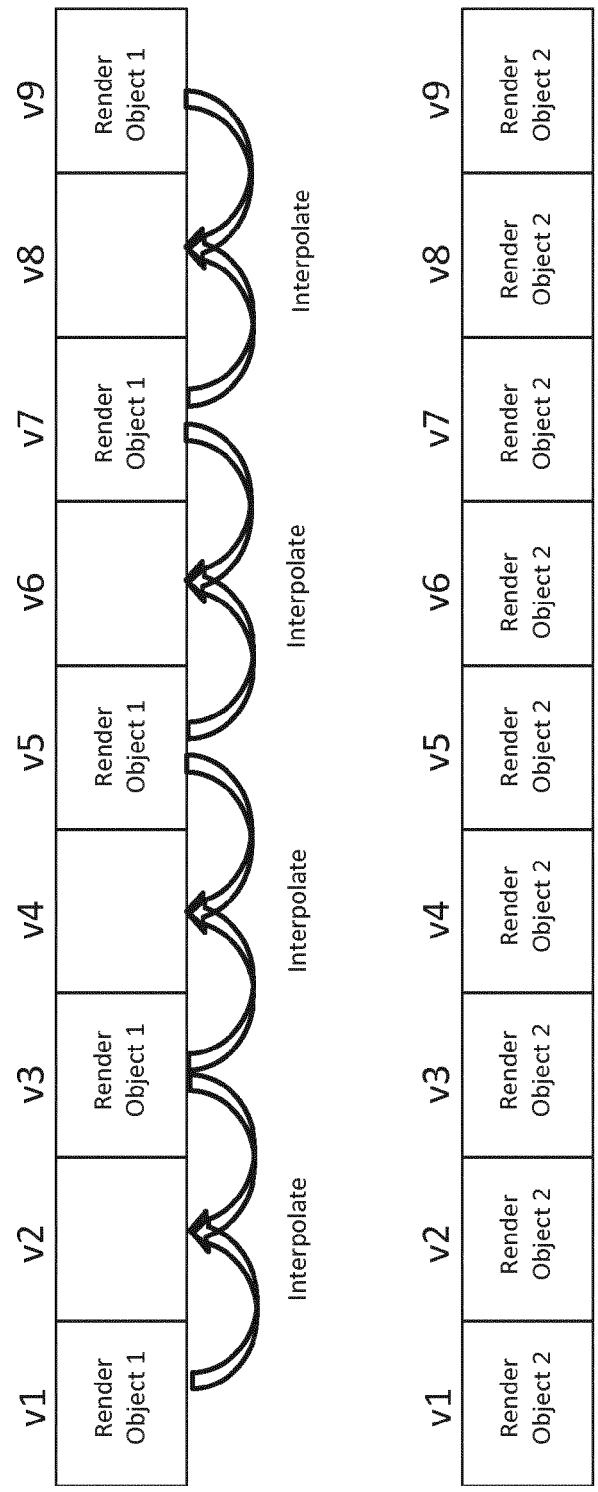
FIG. 10 illustrates aspects of an exemplary approach for generating an output three dimensional image in accordance with some embodiments of the invention.

In the example, the first object 701 was represented only by image block(s) for the center view. In other examples, the first object 701 may be represented by image blocks for a plurality of viewing angles of the autostereoscopic display arrangement 301, such as e.g. for every other viewing angle. Such an example is illustrated in FIG. 10. In this example, the second image generation unit 505 may generate image data for the remaining viewing angles by interpolation.

Text or graphics overlays that are displayed on top of a rendered scene tend to often cause artifacts due to out-of-screen blur. Similar to the above described approach, a text or graphics overlay object can be rendered efficiently by copying the same information, or e.g. with a fixed parallax/disparity between adjacent views, to all views of the autostereoscopic display arrangement 301.

Figure 11:
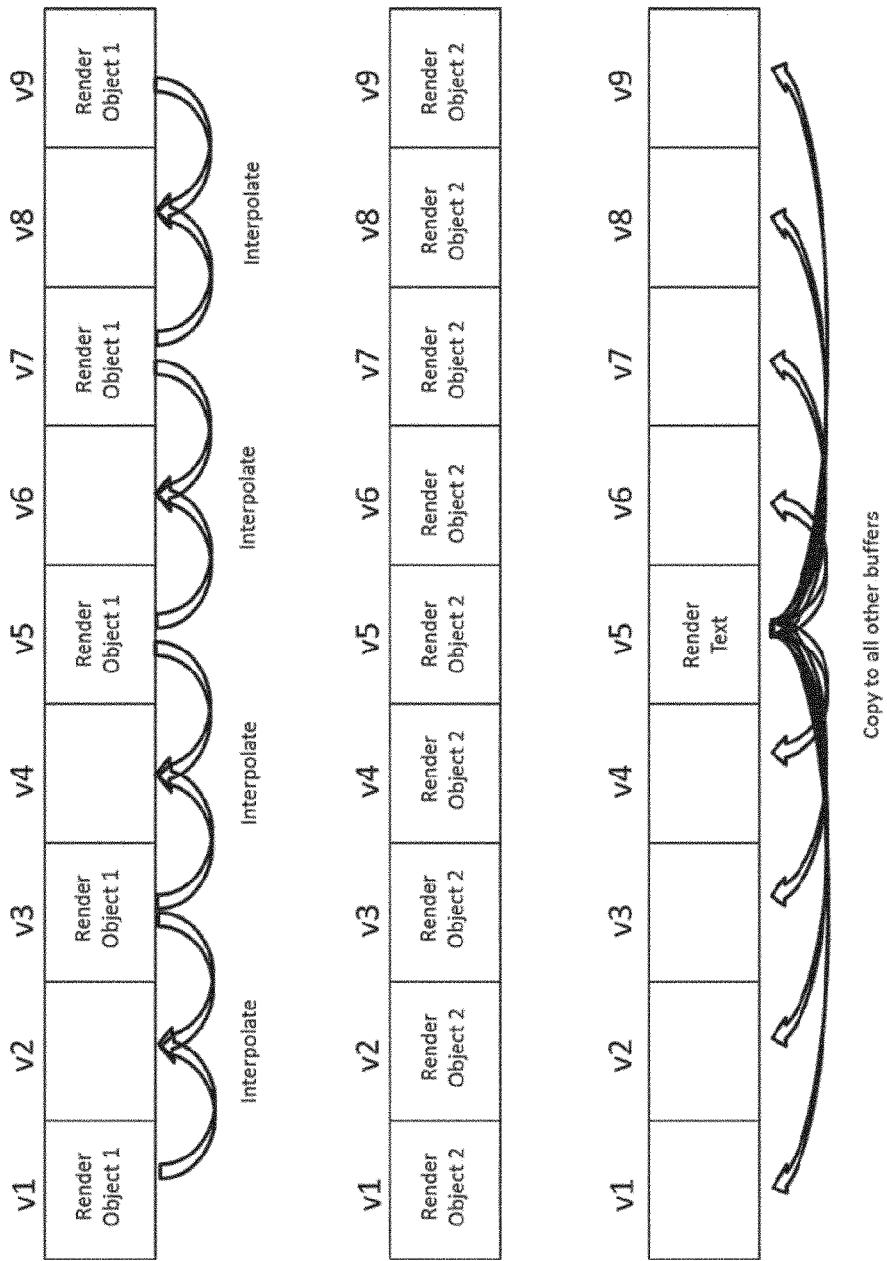
FIG. 11 illustrates aspects of an exemplary approach for generating an output three dimensional image in accordance with some embodiments of the invention.

This may for example be done by the first image generation unit 503 generating the overlay object and storing it in the center view buffer. The second image generation unit 505 may then copy this to all other views. FIG. 11 illustrates such an approach.

In some embodiments, the adaptor (509) may thus be arranged to adapt the number of image blocks in response to a property of the three dimensional model. The property may for example be a property determined by evaluating the model or a property of a parameter used in the processing of the model. For example, the property may be a depth for objects for which the image objects are generated, such as e.g. represented by the near and far clipping planes (which are typically generated based on the model geometry). As another example, the number of image blocks may be adapted based on a property of an object of the three dimensional model, such as for example a property of a texture for an object. If the texture is a high contrast texture, more image blocks may be generated than if the texture is a low contrast texture.

It will be appreciated that the example of copying data to other image buffers is merely an example and that many other approaches are possible. For example, instead of an explicit copy of the data to all view buffers, the second image generation unit 505 may generate a weaved image and as part of this process may directly obtain the data from e.g. the nearest view buffer in which image data is stored for the specific location. Similarly, the copying or interpolation described may be replaced or enhanced by other functions such as directly weaving from the multiple differently rendered parts or having a lookup to such buffers, potentially using the depth buffer as a selection mask.

The previous description has described examples illustrating the approach of generating an output image with a number of view images from an intermediate image in which different spatial regions (spatial subdivisions) have a different number of view directions represented by blocks of pixel values (each block corresponding to a view direction). Thus, a process has been described with a two stage generation of an output image. First, an intermediate image is generated that comprises blocks of pixel values corresponding to different view directions. Further, the number of blocks are different in at least some regions, i.e. the number of blocks/represented view directions differ between different spatial subdivisions. Secondly, an output image is then generated from the pixel value blocks (image blocks) of the intermediate image.

In the described examples, the number of blocks corresponding to the different view direction is not static/fixed/predetermined. Rather, an adapter adapts the number of different view directions based on a property of the intermediate image or the representation of the underlying scene. Thus, the examples describe the approach of adapting the number of view directions provided for an individual region based on a property of the image.

As a further specific example, an image may be imagined which includes a human face and a red ball in front of a blue sky. For such an image, the system may define two regions, one corresponding to the face and one corresponding to the red ball. The adapter may then proceed to e.g. evaluate the colors in the regions and determine that the region corresponding to the face may be predominantly skin colored whereas the region corresponding to the red ball is essentially red. The adapter may then select that for the face region, an image block is generated for every five degrees within a suitable range (i.e. it may implement an algorithm which requires five degree difference for regions that are predominantly skin colored). However, for the ball region, the adapter may select an image block to be generated only for every twenty degrees (i.e. it may implement an algorithm which requires five degree difference for regions that are predominantly red (or perhaps in general, primary) colored).

Thus, assuming a range from, say $-20°$ to $+20°$ is to be covered, the intermediate image may be generated to have pixel value blocks for the face region of $-20°$, $-15°$, $-10°$, $-5°$, $0°$, $5°$, $10°$, $15°$, and $20°$ and for the ball region of $-20°$, $0°$, and $20°$. Thus, due to the specific property of the image, one region is represented by nine image blocks with close viewpoint angles whereas another region is represented by only three image blocks which have large viewing angle differences.

The system may then proceed to generate the output image from this intermediate image. However, the processing is based on a different number of blocks in different regions. For example, the system may generate an output view image for a view direction of $-10°$. In this image, the second image generating unit may generate the area corresponding to the face directly by selecting the pixel values of the $-10°$ blocks of the face region. However, for the ball area, the second image generating unit must generate the pixel values from blocks corresponding to other viewing directions. For example, it may interpolate between the blocks corresponding to $-20°$ and $0°$.

Although a fairly simplistic example, this demonstrates how the described principles may allow the system to perform a (local) image property based adaptation and trade-off between the specific characteristics of the first and second stage processes.

It will be appreciated that the principles of the approaches previously described do not depend or are limited to any specific way of generating the intermediate image or of generating the output image from the intermediate image.

For example, as previously described, one option is to generate the intermediate image by performing view shifting based on an input three dimensional image. Indeed, as described, the system may perform view shifting, de-occlusion, pixel shifting etc. However, this is merely an example of some embodiments and that the approach is in no way limited or dependent on such a specific process. Indeed, another example is the intermediate image being generated from a three dimensional model of a scene, including e.g. texture and light source information.

The previous examples have focused on the generation of the output image using interpolation and specific using a weighted summation. More generally, the second image generator may e.g. generate the output image by a combination of the image blocks. However, many other possible combinations are possible and indeed it is not necessary to perform combinations. For example, the second image generator could generate an image for a given viewing direction by simply for each pixel selecting the pixel value of the pixel at that position in the image block that is generated for the closest view direction. For example, in the above example, the pixels for the face region could be selected as the pixel values for image blocks for an angle of $-10°$ and the pixels for the ball region could be selected as the pixel values for image blocks for an angle of $-20°$ (or $0°$).

Also, in line with the previous examples, the generation of the intermediate image by the first image generating unit may indeed be based on depth information. However, in other embodiments the generation of the intermediate image by the first image generating unit may not be based on depth information. For example, the use of extrapolation and interpolation based rendering is possible approaches for generating the image blocks of the intermediate image.

The previous examples have focused on the first image generation unit employing a depth based rendering/algorithm whereas the second image generation unit employs a non-depth based rendering. This provides a particularly advantageous approach in many scenarios. Specifically, in many applications, the first image generation unit may employ a relatively complex and resource demanding depth based algorithm to generate image blocks with a relatively high quality whereas the second image generation unit may employ a relatively low complexity and low resource demanding, but less accurate, non-depth based algorithm to generate the view images from image blocks. E.g. the first image generation unit may use a depth based view synthesis algorithm to generate the image blocks of the intermediate image and the second image generation unit may simply interpolate (or even just select from these). In such cases, the approach may allow a spatially diverse adaptation and trade-off between the first stage and the second stage.

However, in other embodiments, the first image generation unit may be arranged to generate high quality image blocks using a non-depth based algorithm. For example, the first image generation unit may be arranged to receive an input in the form of a large number of high quality captured images corresponding to different view directions. It may proceed to generate the required image blocks for a region by applying a complex interpolation based on applying complex spatial filters and based on several of the received images. The second image generation unit may then generate the output image e.g. by a simple interpolation or by selecting the image blocks with the closest view direction. In such an embodiment, the adaptor may still, by adapting the number of image viewpoints represented in different regions, provide a trade-off between the characteristics of the different stages. For example, it may allow an adaptation where more resource is allocated to regions considered more significant (e.g. more resource will be used generating more image blocks for the face region than for the red ball region).

It is also noted, that it is also feasible for the second image generation unit to use depth based processing. For example, in the above example, the intermediate image may be generated with a high image quality (e.g. high resolution, high color depth, high dynamic range). The second image generation unit may, when generating the view images, consider depth information. For example, it may generate a pixel for a view image by view shifting from the corresponding image block with the closest view direction. This view shifting may be based on e.g. a low resolution depth map provided with an input image but not considered by the first image generation unit. Thus, in such an embodiment, the generation of the intermediate image may be non-depth based whereas the generation of the output image from the intermediate image may be depth based. Such an approach may for example also allow an adaption such that increased resource is expended at appropriate regions (e.g. the face region).

It is also noted that it is not necessary that the algorithm used by the first image generation unit is more complex, higher quality, or more resource demanding than the algorithm used by the second image generation unit. Although, such embodiments may provide a particularly advantageous implementation in many scenarios, the approach may also be applied in embodiments where this is not the case. E.g., the approach can still allow an adaptation where the overall perceived image quality is improved by focusing resource on areas considered particularly significant.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

What is claimed is:

1. An apparatus for generating an output three dimensional image, the apparatus comprising:
    a first image generating circuit arranged to generate an intermediate three dimensional image, the intermediate three dimensional image comprising a plurality of regions,
        wherein the plurality of regions are spatial subdivisions of the intermediate three dimensional image,
        wherein the first image generating circuit is arranged to generate a number of image blocks of pixel values for the plurality of regions,
        wherein the number of image blocks is different for at least two regions of the plurality of regions, and
        wherein each image block comprises pixel values for a group of pixels, the group of pixels corresponding to a view direction;
    a second image generating circuit arranged to generate the output three dimensional image, the output three dimensional image comprising a number of view images from the intermediate three dimensional image, wherein each of the number of view images corresponds to a view direction; and
    an adaptor arranged to adapt a number of image blocks with different viewing directions for at least a first region,
        wherein the at least first region is one of the plurality of regions, and
        wherein the adaptation is in response to a property of at least one of the intermediate three dimensional image and a representation of a three dimensional scene from which the first image generating circuit is arranged to generate the intermediate three dimensional image.

2. The apparatus of claim 1 wherein the property is a depth measure.

3. The apparatus of claim 1 wherein the property is a contrast measure.

4. The apparatus of claim 1 wherein the adapter is further arranged to determine the number of image blocks for the first region in response to a computational resource availability for the first image generating circuit.

5. The apparatus of claim 1 wherein the plurality of regions comprises regions formed by at least one pixel row.

6. The apparatus of claim 1 wherein at least one region of the plurality of regions comprises only a subset of pixels of a pixel row.

7. The apparatus of claim 1,
wherein the first image generation circuit is arranged to generate image blocks for all regions of the plurality of regions for a plurality of viewing directions, and
wherein the adapter is arranged to subsequently select a subset of regions of the plurality of regions for which to generate image blocks for at least one additional view direction in response to disparities between the image blocks of each region for the plurality of viewing angles.

8. The apparatus of claim 1 wherein the adapter is arranged to select a region for which to generate an image block for at least one additional viewing angle in response to a disparity measure exceeding a threshold, the disparity measure being a measure of disparity for two image blocks for two viewing angles, wherein the two viewing angles are adjacent to the additional viewing angle.

9. The apparatus of claim 1,
wherein the adapter is arranged to determine a subset of regions for which a depth measure is below a threshold, and
wherein the adapter is arranged to set the number of image blocks in each region of the subset to one.

10. The apparatus of claim 1 wherein the property is a visual property.

11. The apparatus of claim 1 wherein the property is indicative of at least one of a brightness property and a color property.

12. The apparatus of claim 1,
wherein the first image generation circuit is arranged to generate the intermediate three dimensional image based on a three dimensional model of a three dimensional scene;
wherein the adaptor is arranged to adapt the number of image blocks in response to a property of the three dimensional model.

13. An autostereoscopic three dimensional display, comprising:
a first image generating circuit arranged to generate an intermediate three dimensional image, the intermediate three dimensional image comprising a plurality of regions,
wherein the plurality of regions are spatial subdivisions of the intermediate three dimensional image,
wherein the first image generating circuit is arranged to generate a number of image blocks of pixel values for the plurality of regions,
wherein the number of image blocks is different for at least two regions of the plurality of regions, and
wherein each image block comprises pixel values for a group of pixels, the group of pixels corresponding to a view direction;
a second image generating circuit arranged to generate an output three dimensional image, the output three dimensional image comprising a number of view images from the intermediate three dimensional image, wherein each of the number of view images corresponds to a view direction;
a display arrangement for displaying three dimensional images;
a display driver circuit for driving the display arrangement to display the output three dimensional image; and
an adaptor arranged to adapt a number of image blocks with different viewing directions for at least a first region,
wherein the at least first region is one of the plurality of regions, and
wherein the adaptation is in response to a property of at least one of the intermediate three dimensional image and a three dimensional input image to the first image generating circuit.

14. A method of generating an output three dimensional image, the method comprising:
generating an intermediate three dimensional image the three dimensional image comprising a plurality of regions,
wherein the plurality of regions are spatial subdivisions of the intermediate three dimensional image,
wherein the generating of the intermediate three dimensional image comprises generating a number of image blocks of pixel values for the plurality of regions,
wherein the number of image blocks are different for at least two regions, and
wherein the plurality of regions and each image block comprise pixel values for a group of pixels corresponding to a view direction;
generating the output three dimensional image, the output three dimensional image comprising a number of view images from the intermediate three dimensional image, wherein each of the number of view images corresponds to a view direction; and
adapting a number of image blocks with different viewing directions for at least a first region,
wherein the at least first region is one of the plurality of regions, and
wherein the adapting is in response to a property of at least one of the intermediate three dimensional image and a three dimensional input image used to generate the intermediate three dimensional image.

15. A computer program product comprising computer program code arranged to perform all the steps of claim 14 when the program is run on a computer circuit.

16. The method of claim 14 wherein the property is a depth measure.

17. The method of claim 14 wherein the property is a contrast measure.

18. The method of claim 14 wherein the adapting is further arranged to determine the number of image blocks for the first region in response to a computational resource availability.

19. The method of claim 14 wherein the plurality of regions comprises regions formed by at least one pixel row.

20. The method of claim 14 wherein at least one region of the plurality of regions comprises only a subset of pixels of a pixel row.

* * * * *